United States Patent
Johnson et al.

(10) Patent No.: US 10,872,448 B2
(45) Date of Patent: *Dec. 22, 2020

(54) EDGE ENHANCEMENT FOR THERMAL-VISIBLE COMBINED IMAGES AND CAMERAS

(71) Applicant: Fluke Corporation, Everett, WA (US)

(72) Inventors: Kirk R. Johnson, Rogers, MN (US); Matthew F. Schmidt, River Falls, WI (US)

(73) Assignee: Fluke Corporation, Everett, WA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/169,554

(22) Filed: Oct. 24, 2018

(65) Prior Publication Data

US 2019/0130621 A1 May 2, 2019

Related U.S. Application Data

(63) Continuation of application No. 14/837,757, filed on Aug. 27, 2015, now Pat. No. 10,152,811.

(51) Int. Cl.
*G06K 9/46* (2006.01)
*G06K 9/66* (2006.01)
(Continued)

(52) U.S. Cl.
CPC ............ *G06T 11/60* (2013.01); *G06T 5/50* (2013.01); *G06T 7/13* (2017.01); *H04N 5/332* (2013.01);
(Continued)

(58) Field of Classification Search
CPC ... G06T 11/60; G06T 5/50; G06T 7/13; G06T 2207/20221; G06T 2207/20192;
(Continued)

(56) References Cited

U.S. PATENT DOCUMENTS 4,782,399 A 11/1988 Sato
4,949,166 A 8/1990 Isnardi
(Continued)

FOREIGN PATENT DOCUMENTS

CN 1545064 C 9/2006
CN 101067710 A 11/2007
(Continued)

OTHER PUBLICATIONS

Angel, et al., Review of Fusion Systems and Contributing Technologies for SIHS, Humansystems, Incorporated, Defence Research and Development Canada-Toronto, Mar. 31, 2007, 112 pgs.
(Continued)

*Primary Examiner* — Samir A Ahmed
(74) *Attorney, Agent, or Firm* — Fredrikson & Byron, P.A.

(57) ABSTRACT

Systems and methods directed toward combining visible light and infrared images can include processing visible light image data to determine an edge factor value for a plurality of visible light pixels corresponding to the strength of an edge at that location. The edge factor value can be determined using features from the visible light image data and an edge gain input, which may be adjustable by a user. The edge factor values are combined with an edge midscale value to create a first set of modified visible light image data including pixels emphasized based on the strength of the edge in the visible light image. The modified visible light image data is combined with infrared image data to create combined image data having contribution from the infrared image data and the edge factor values from the visible light image data.

20 Claims, 14 Drawing Sheets

(51) Int. Cl.
*G06T 11/60* (2006.01)
*G06T 5/50* (2006.01)
*H04N 5/33* (2006.01)
*G06T 7/13* (2017.01)

(52) U.S. Cl.
CPC .............. *G06T 2207/10024* (2013.01); *G06T 2207/10048* (2013.01); *G06T 2207/20192* (2013.01); *G06T 2207/20221* (2013.01)

(58) Field of Classification Search
CPC .......... G06T 2207/10024; G06T 2207/10048; H04N 5/332; H04N 1/4092; H04N 5/142
See application file for complete search history.

(56) References Cited

U.S. PATENT DOCUMENTS

| | | | |
|---|---|---|---|
| 4,967,276 | A | 10/1990 | Murakami et al. |
| 5,133,605 | A | 7/1992 | Nakamura |
| 5,325,449 | A | 6/1994 | Burt et al. |
| 5,488,674 | A | 1/1996 | Burt et al. |
| 5,555,324 | A | 9/1996 | Waxman et al. |
| 5,910,816 | A | 6/1999 | Fontenot et al. |
| 5,949,914 | A | 9/1999 | Yuen |
| 5,969,754 | A | 10/1999 | Zeman |
| 5,974,165 | A | 10/1999 | Giger et al. |
| 6,898,331 | B2 | 5/2005 | Tiana |
| 6,920,236 | B2 | 7/2005 | Prokoski |
| 7,199,366 | B2 | 4/2007 | Hahn et al. |
| 7,298,404 | B2 | 11/2007 | Shimazaki |
| 7,324,072 | B1 | 1/2008 | Canova, Jr. et al. |
| 7,491,935 | B2 | 2/2009 | Burne et al. |
| 7,538,326 | B2 | 5/2009 | Johnson et al. |
| 7,570,286 | B2 | 8/2009 | Koike et al. |
| 7,589,771 | B2 | 9/2009 | Hosaka et al. |
| 7,593,573 | B2 | 9/2009 | Hahn et al. |
| 7,613,360 | B2 | 11/2009 | Ma et al. |
| 7,620,265 | B1 | 11/2009 | Wolff et al. |
| 7,667,762 | B2 | 2/2010 | Jenkins |
| 7,693,331 | B2 | 4/2010 | Porikli et al. |
| 7,705,855 | B2 | 4/2010 | Brown Elliott |
| 7,876,973 | B2 | 1/2011 | Fairbanks et al. |
| 7,924,312 | B2 | 4/2011 | Packard |
| 7,961,229 | B2 | 6/2011 | Soga |
| 7,994,480 | B2 | 8/2011 | Johnson et al. |
| 8,254,718 | B2 | 8/2012 | Bennett et al. |
| 8,374,438 | B1 | 2/2013 | Wagner |
| 8,457,437 | B2 | 6/2013 | Peterson et al. |
| 8,503,778 | B2 | 8/2013 | Sim et al. |
| 8,520,970 | B2 | 8/2013 | Strandemar |
| 8,565,547 | B2 | 10/2013 | Strandemar |
| 8,614,746 | B2 | 12/2013 | Choe et al. |
| 8,630,465 | B2 | 1/2014 | Wieringa et al. |
| 8,723,958 | B2 | 5/2014 | Kamon et al. |
| 8,749,635 | B2 | 6/2014 | Hgasten et al. |
| 8,781,246 | B2 | 7/2014 | Lewis et al. |
| 9,088,737 | B2 | 7/2015 | Hahn et al. |
| 10,152,811 | B2 * | 12/2018 | Johnson .................. H04N 5/332 |
| 2002/0015536 | A1 | 2/2002 | Warren et al. |
| 2005/0270425 | A1 | 12/2005 | Min |
| 2006/0268110 | A1 | 11/2006 | Koike et al. |
| 2007/0183657 | A1 | 8/2007 | Kidono et al. |
| 2007/0201738 | A1 | 8/2007 | Toda et al. |
| 2007/0291170 | A1 | 12/2007 | Han et al. |
| 2008/0024608 | A1 | 1/2008 | Hahn et al. |
| 2008/0111894 | A1 | 5/2008 | Tanimoto |
| 2008/0284791 | A1 | 11/2008 | Bressan et al. |
| 2009/0302219 | A1 | 12/2009 | Johnson et al. |
| 2010/0045809 | A1 | 2/2010 | Packard |
| 2010/0073499 | A1 | 3/2010 | Gere |
| 2010/0085433 | A1 | 4/2010 | Choe et al. |
| 2010/0290703 | A1 | 11/2010 | Sim et al. |
| 2011/0001809 | A1 | 1/2011 | McManus et al. |
| 2011/0122251 | A1 | 5/2011 | Schmidt |
| 2011/0122252 | A1 | 5/2011 | Choi et al. |
| 2012/0086810 | A1 | 4/2012 | Messerschmid |
| 2012/0128243 | A1 | 5/2012 | Singh et al. |
| 2012/0154596 | A1 | 6/2012 | Wajs |
| 2012/0262584 | A1 | 10/2012 | Strandemar |
| 2013/0155249 | A1 | 6/2013 | Neeley et al. |
| 2013/0342691 | A1 | 12/2013 | Lewis et al. |
| 2014/0015982 | A9 | 1/2014 | Strandemar |
| 2014/0104415 | A1 | 4/2014 | Fox et al. |
| 2014/0160298 | A1 | 6/2014 | Johnson |
| 2014/0240512 | A1 | 8/2014 | Hgasten et al. |
| 2014/0267353 | A1 | 9/2014 | Schmidt et al. |
| 2014/0340515 | A1 | 11/2014 | Tanaka et al. |
| 2014/0355902 | A1 | 12/2014 | Olsson |
| 2015/0109454 | A1 | 4/2015 | Strandemar et al. |
| 2015/0269742 | A1 | 9/2015 | Bergstrom et al. |

FOREIGN PATENT DOCUMENTS

| | | |
|---|---|---|
| CN | 101546428 B | 8/2011 |
| CN | 101714251 B | 4/2013 |
| CN | 103063314 A | 4/2013 |
| CN | 103270746 A | 8/2013 |
| CN | 105009568 A | 10/2015 |
| DE | 10218175 B4 | 10/2011 |
| EP | 892286 A1 | 1/1999 |
| EP | 1975673 A2 | 10/2008 |
| EP | 2194503 A1 | 6/2010 |
| JP | S6211384 A | 1/1987 |
| JP | H03125573 A | 5/1991 |
| JP | 2007143624 A | 6/2007 |
| JP | 2010103740 A | 5/2010 |
| JP | 2012120047 A | 6/2012 |
| JP | 2013039223 A | 2/2013 |
| KR | 20030085742 A | 11/2003 |
| WO | 2006017233 A1 | 2/2006 |
| WO | 2009002902 A2 | 12/2008 |
| WO | 2014100786 A1 | 6/2014 |

OTHER PUBLICATIONS

Bebis, et al., Face recognition by fusing thermal infrared and visible imagery, Image and Vision Computer 24, 2006, pp. 727-742.

Bennett, et al., Multispectral Bilateral Video Fusion, IEEE Transactions on Image Processing, vol. 16, No. 5, May 2007, pp. 1185-1194.

Davis, et al., Background-Subtraction in Thermal Imagery Using Contour Saliency, International Journal of Computer Vision 71(2), Jun. 2006, pp. 161-181.

Gangkofner, et al., Optimizing the High-Pass Filter Addition Technique for Image Fusion, Photogrammetric Engineering & Remote Sensing, vol. 74, No. 9, Sep. 2008, pp. 1107-1118.

Heather, et al., Multimodal Image Registration with Applications to Image Fusion, 7th International Conference on Information Fusion, 2005, pp. 372-379.

Ibrahim, et al., Visible and IR Data Fusion Technique Using the Contourlet Transform, 2009 International Conference on Computational Science and Engineering, Aug. 29-31, 2009, pp. 42-47.

Jang, et al., Pseudo-color image fusion based on intensity-hue-saturation color space, Proceedings of IEEE International Conference on Multisensor Fusion and Integration for Intelligent Systems, Aug. 20-22, 2008, pp. 366-371.

Jiang, et al., Perceptual-based fusion of IR and visual images for human detection, Proceedings of International Symposium on Intelligent Multimedia, Video and Speech Processing, Oct. 20-22, 2004, pp. 514-517.

Li, et al., Merging infrared and color visible images with an contrast enhanced fusion method, Proceedings of SPIE, vol. 6571, on Multisensor, Multisource Information Fusion: Architectures, Algorithms, and Applications , Apr. 9, 2007, 13 pgs.

Sharma, et al., A feature-selection approach to fusing electro-optical and IR imagery, SPIE Newsroom, Feb. 25, 2008, 3 pgs.

Sharma, et al., Feature-level fusion for object segmentation using mutual information, Augmented Vision Perception in Infrared, Springer, Dec. 2008, pp. 295-319.

(56) References Cited

OTHER PUBLICATIONS

Therrien, et al., An Adaptive Technique for the Enhanced Fusion of Low-Light Visible with Uncooled Thermal Infrared Imagery, Naval Postgraduate School, Monterey, California, 4 pgs.

Toet, et al., Merging thermal and visual images by a contrast pyramid, Optical Engineering 28(7), Jul. 1989, pp. 789-792.

Toet, et al., Perceptual evaluation of different image fusion schemes, Displays 24, 2003, pp. 25-37.

Toet, Hierarchical Image Fusion, Machine Vision and Applications, 1990, 11 pgs.

Vrabel, Multispectral Imagery Band Sharpening Study, Photogrammetric Engineering & Remote Sensing, vol. 62, No. 9, Sep. 1996, pp. 1075-1083.

Wang, et al., A comparative analysis of image fusion methods, IEEE Transactions on Geoscience and Remote Sensing, vol. 43, No. 6, Jun. 2005, pp. 1391-1402.

Wolff, et al., Advances in Low-Power Visible/Thermal IR Video Image Fusion Hardware, Proceedings of SPIE on Thermosense XXVII, vol. 5782, Mar. 28, 2005, pp. 54-58.

Wolff, et al., Versatile Low-Power Multi-Spectral Video Fusion Hardware, Proceedings of SPIE on Infrared Technology and Applications XXXIII, vol. 6206, 2006, 6 pgs.

Extended European Search Report for Application No. EP16185894.9, 11 pages, dated Jan. 20, 2017.

A Real Time Pixel-level based image fusion via adaptive eight averaging; 11 pages, Jul. 20, 2000.

Guoqiang, et al. "Real-Time Color Image Fusion and its Key Technologies," [online], Department of Optical Engineering, School of Information Science and Technology, Beijing Institute of Technology, [retrieved Jun. 17, 2015], Retrieved from the Internet: <URL: http://www.coema.org.cn/E_real.htm>.

U.S. Appl. No. 14/138,058, entitled "Compact Multi-Spectrum Imaging With Fusion," filed Dec. 21, 2013.

U.S. Appl. No. 14/138,052, entitled "Infrared Imaging Enhancement With Fusion," filed Dec. 21, 2013.

\* cited by examiner

1000

1006a

1006b

1006c

1006d

EDGE ENHANCEMENT FOR THERMAL-VISIBLE COMBINED IMAGES AND CAMERAS

CROSS REFERENCE TO RELATED APPLICATION

This application is a continuation application of U.S. patent application Ser. No. 14/837,757, filed Aug. 27, 2015 and titled "EDGE ENHANCEMENT FOR THERMAL-VISIBLE COMBINED IMAGES AND CAMERAS." The entire content of this application is incorporated herein by reference.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image. For example, overlapping and/or combining the visible light image and the thermal image can provide some guidance for the operator. However, in some situations, it can still be difficult to distinguish edges and boundaries of objects in the thermal image.

SUMMARY

Aspects of the present disclosure are directed toward systems and methods for combining corresponding visible light and infrared image data. In some embodiments, a system includes a memory capable of storing one or more sets of visible light image data and infrared image data. A system can include a processor configured to process a first set of visible light image data to determine an edge factor value for each pixel in the first set of visible light image data. The magnitude of the edge factor value may be representative of the strength of an edge at a particular location. In some examples, the edge factor value is based on the visible light image data and an edge gain input. The system can include a user interface by which the edge gain input can be adjustable. In some embodiments, processing the visible light image data can include performing an embossing process. The embossing process can include determining a pseudo-luminance value for each of a plurality of pixels and processing the pseudo-luminance values via a processing kernel to determine the emboss value for at least one pixel associated with the kernel.

In some examples, the processor can be configured to combine the edge factor value associated with each pixel in the first set of visible light image data with an edge midscale value to create a first set of modified visible light image data. Accordingly, in some such examples, the modified VL image data represents the edge midscale value offset or otherwise adjusted by the edge factor value at each pixel. In some examples, the edge midscale value can be a scalar value (e.g., a luminance value) or a vector (e.g., having R, G, and B components). The edge midscale value can include gray or any other color. In some examples, the edge midscale value may be selectable or adjustable via the user interface.

In some embodiments, the processor can be configured to combine the first set of modified visible light image with a first set of infrared image data that corresponds to the first set of visible light image data to generate a first set of combined image data. The resulting combination can include infrared image data combined with values representative of the strength of visible light images at corresponding pixels. As such, edges present in the visible light image data may be enhanced or otherwise visible in the combined image.

The infrared image data can include a scalar infrared values (e.g., infrared intensities) or vector values (e.g., having R, G, and B components) based on a palettization scheme, for example. In some examples, the palettization scheme of the infrared image data may be selectable via a user interface. In some examples, combining the infrared and visible light image data can include blending the infrared and visible light image data, for example, using a blending ratio. In some such embodiments, blending ratio is variable across the combined image. For instance, in some examples, the blending ratio at each pixel in the combined image is based on the edge factor value at corresponding visible light pixels.

In various examples, visible light and infrared image data can be acquired from a variety of sources. For instance, one or both of visible light and infrared image data can comprise image data recalled from memory. Additionally or alternatively, one or both of visible light and infrared image data can comprise a stream of image data, for example, acquired from one or more camera modules or other sensors. In some examples, the system can include one or both of visible light and infrared camera modules for acquiring visible light image data and infrared image data, respectively.

Embodiments of some such systems enable a variety of user-adjustable features. For example, in some embodiments, a user may adjust at least one of an edge gain, an edge midscale value, an infrared palettization scheme, and at least one aspect of combining the visible light and infrared image data.

In some examples, a processor may perform one or more such functions according to instructions on a non-transitory computer readable medium. Additionally or alternatively, various such components can be enclosed in or otherwise supported by a housing. For example, a thermal imaging camera may include infrared and visible light camera modules capable of generating infrared and visible light image data, respectively. The camera can further include a processor for processing the infrared and visible light image data to generate a combined image, and a display on which to present the combined image. The camera could be used to perform thermographic processes with the benefit of edges from the visible light image data in the thermographic images.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
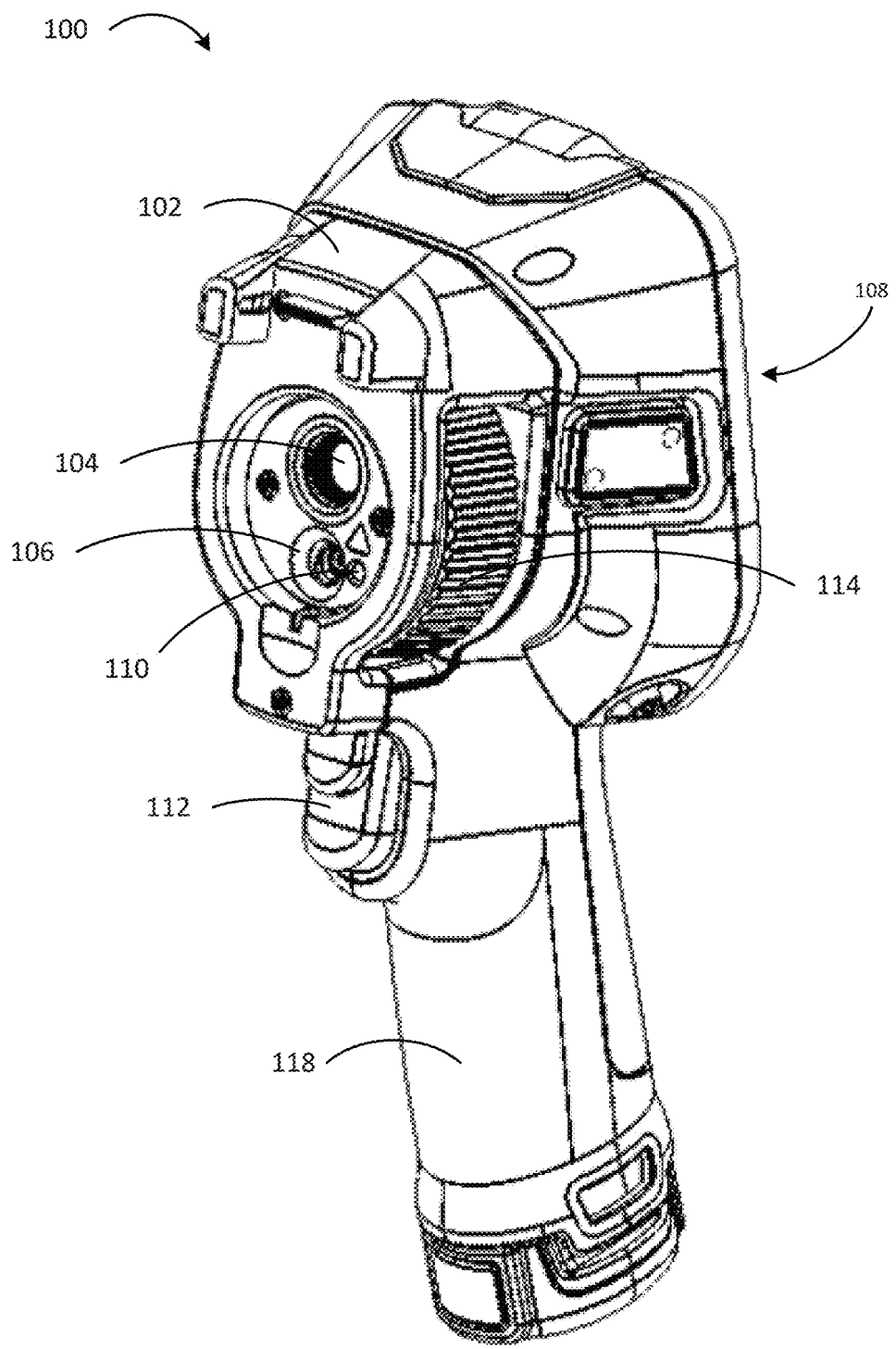
FIG. 1 is a perspective front view of an example thermal imaging camera.
Figure 2:
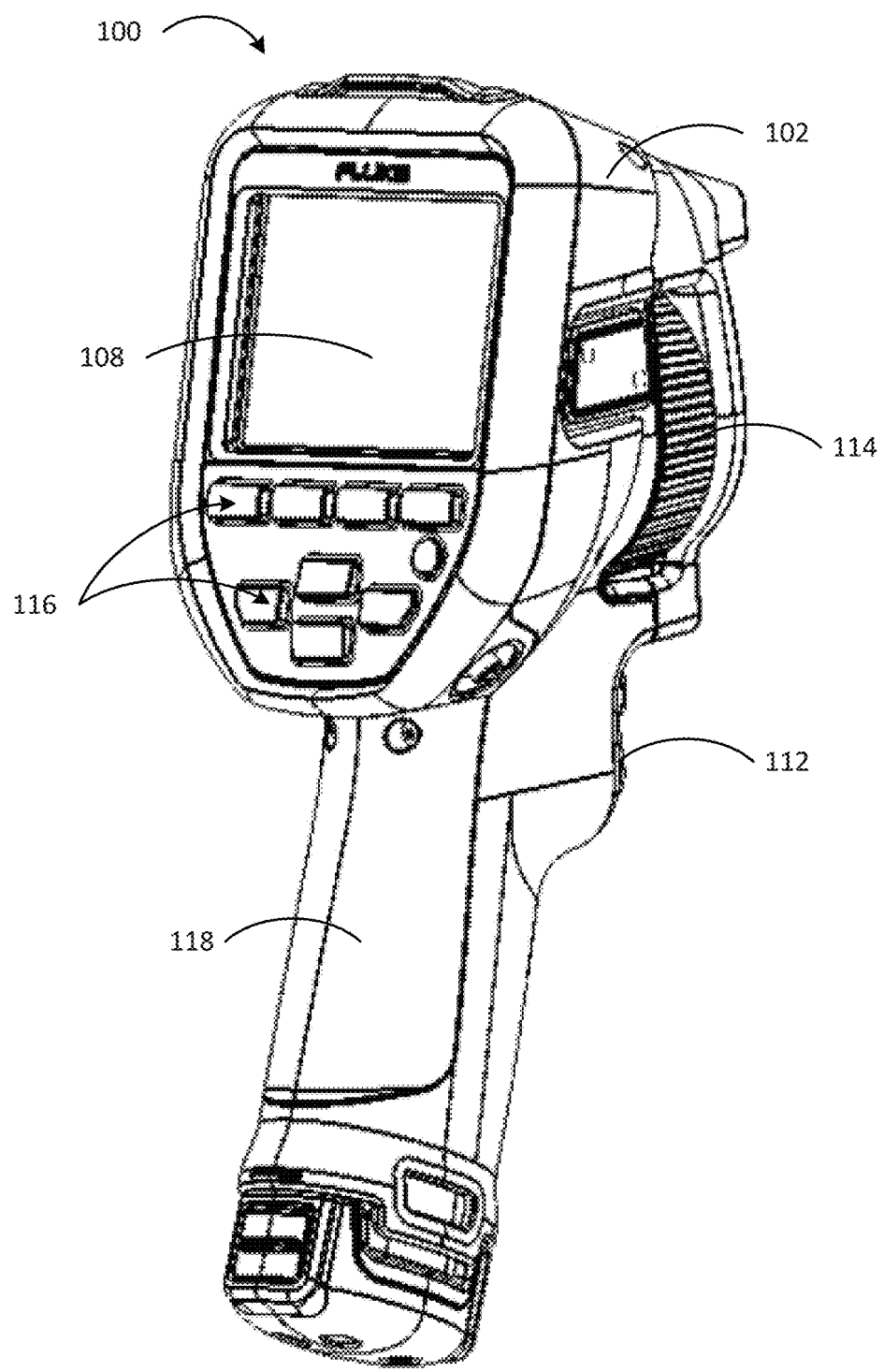
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle 118 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera. Additionally or alternatively, the focus mechanism may move the FPA relative to one or more lenses of the infrared lens assembly.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move one or both of the FPA and the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
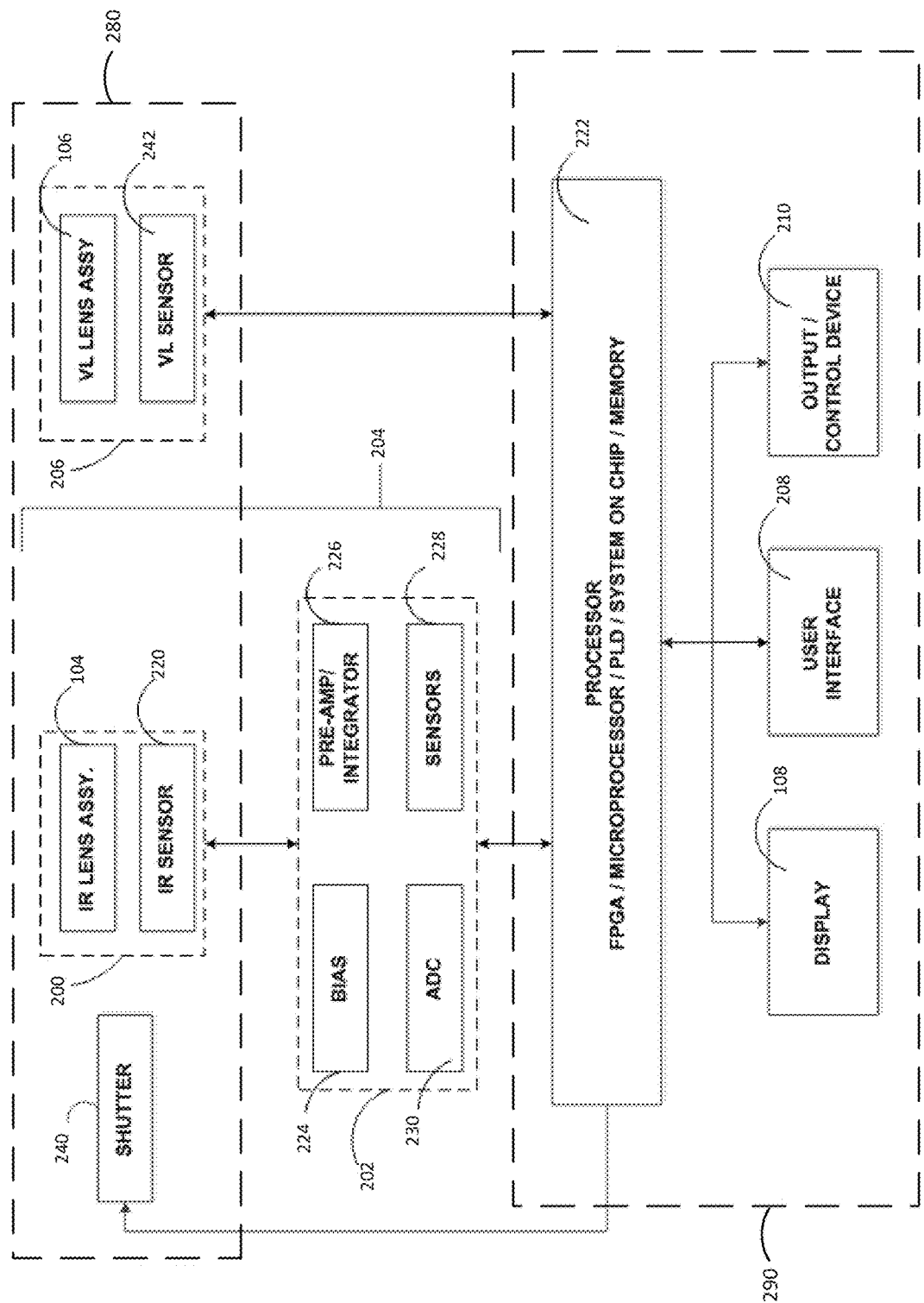
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like.

The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone, a tablet, a stand-alone computer such as a laptop or desktop PC, or the like. In some such embodiments, various components of front end circuitry 202 may be included in the image acquisition module 280, the processing module 290, or both.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

As noted, in some situations, it can be difficult to identify and differentiate between real-world (visible) features of the target scene in a thermal image. In addition to supplementing the infrared image with visible light information, in some embodiments, it can be useful to emphasize visible edges within the target scene. While in some instances the detection of visible light edges can be difficult to perform in an infrared image (e.g., across a uniform thermal scene), known edge detection methods can be performed on a corresponding visible light image of the same target scene. Because of the corresponding relationship between the infrared image and the visible light image, visible light pixels determined to represent a visible edge in the target scene correspond to infrared pixels also representing the visible edge in the infrared image. It will be appreciated that, as used herein, "edges" need not refer to the physical boundary of an object, but may refer to any sufficiently sharp gradient in the visible light image. Examples may include physical boundaries of an object, color changes within an object, shadows across a scene, and the like.

Figure 4:
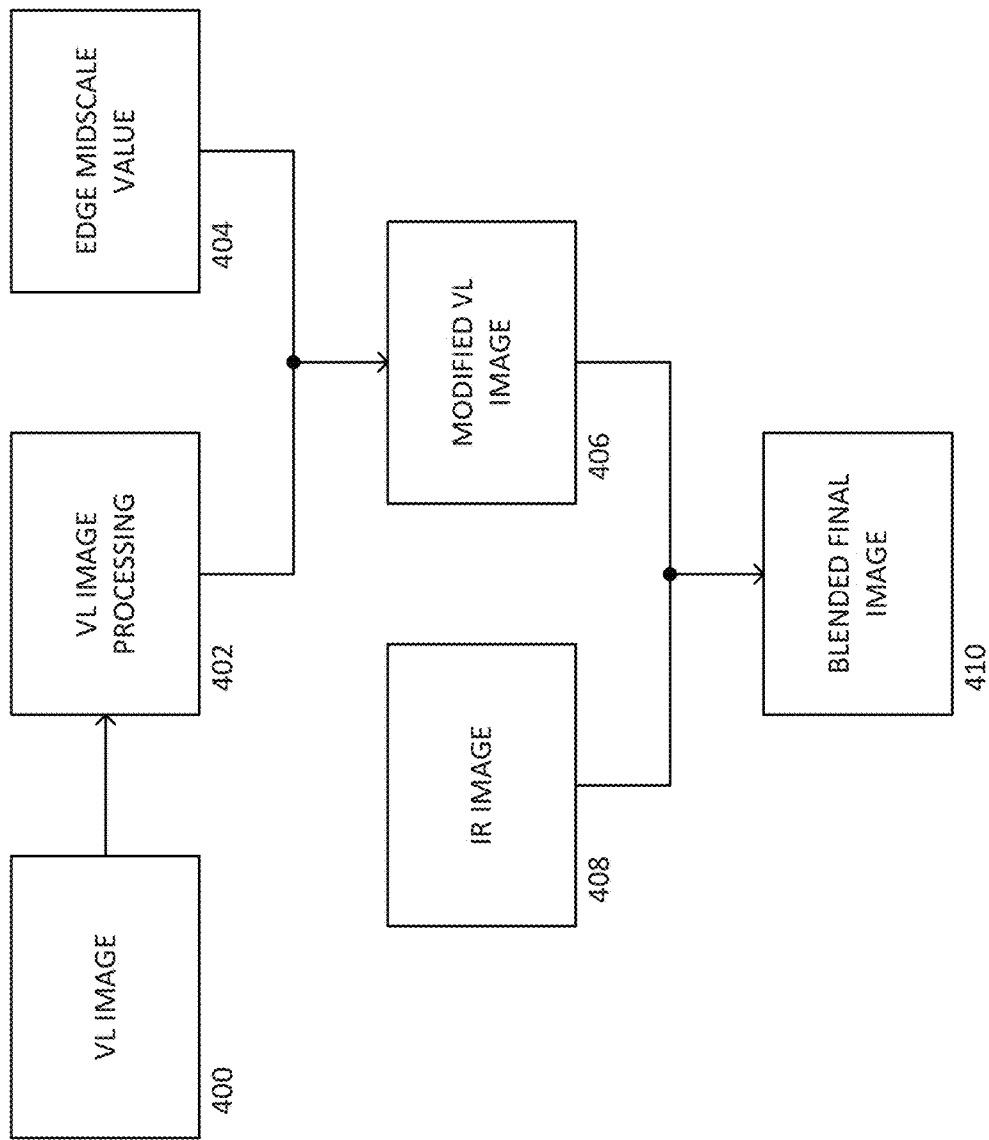
FIG. 4 is a high-level schematic diagram illustrating an exemplary technique for enhancing edges in an IR image.

FIG. 4 is a high-level schematic diagram illustrating an exemplary technique for enhancing edges in an IR image. In the illustrated embodiment, a visible light image 400 is processed 402, which may include a variety of processing steps. For instance, in some examples, processing may include filtering the image for noise reduction, enhancing edges, or any other processing techniques. In some examples, processing may include an embossing or other edge detection processes for emphasizing edges from the VL image.

In the illustrated embodiment, the resulting processed VL image is combined with an edge midscale value 404 to generate a modified VL image 406. The edge midscale value 404 may include, for instance, a specific color. In some embodiments, the edge midscale value 404 may be selectable by a user. In some examples, combining the processed VL image 402 with the edge midscale value 404 comprises combining the processed VL image with an image consisting exclusively of the edge midscale value 404. That is, in some embodiments, a processed VL image is created and an edge midscale value "image" is created or recalled from memory. These two images are combined by any appropriate combination method to generate the modified VL image 506.

In other embodiments, the combining can include combining each pixel of the processed VL image 402 with the edge midscale value. That is, the combination is not done image-wide at once, but rather, on a pixel-by-pixel or cluster-by-cluster basis. The camera need not store or create an edge midscale value "image", but rather may perform pixel-wise combinations of processed VL image data and the edge midscale value to determine modified VL pixel data. The modified VL image 406 may include emphasized edge information as will be described below. The modified VL image 406 can be combined with an IR image 408 corresponding to the VL image 400 to create a blended final image 410. The resulting blended final image 410 may include both IR image data and emphasized edge information from the VL image 400. As described herein, combining (e.g., the processed VL image 402 and the edge midscale value 404, or the IR image 408 and the modified VL image 406) may be performed in any of a variety of known image combination techniques, such as addition, averaging, alpha-blending, and the like.

Figure 5A:
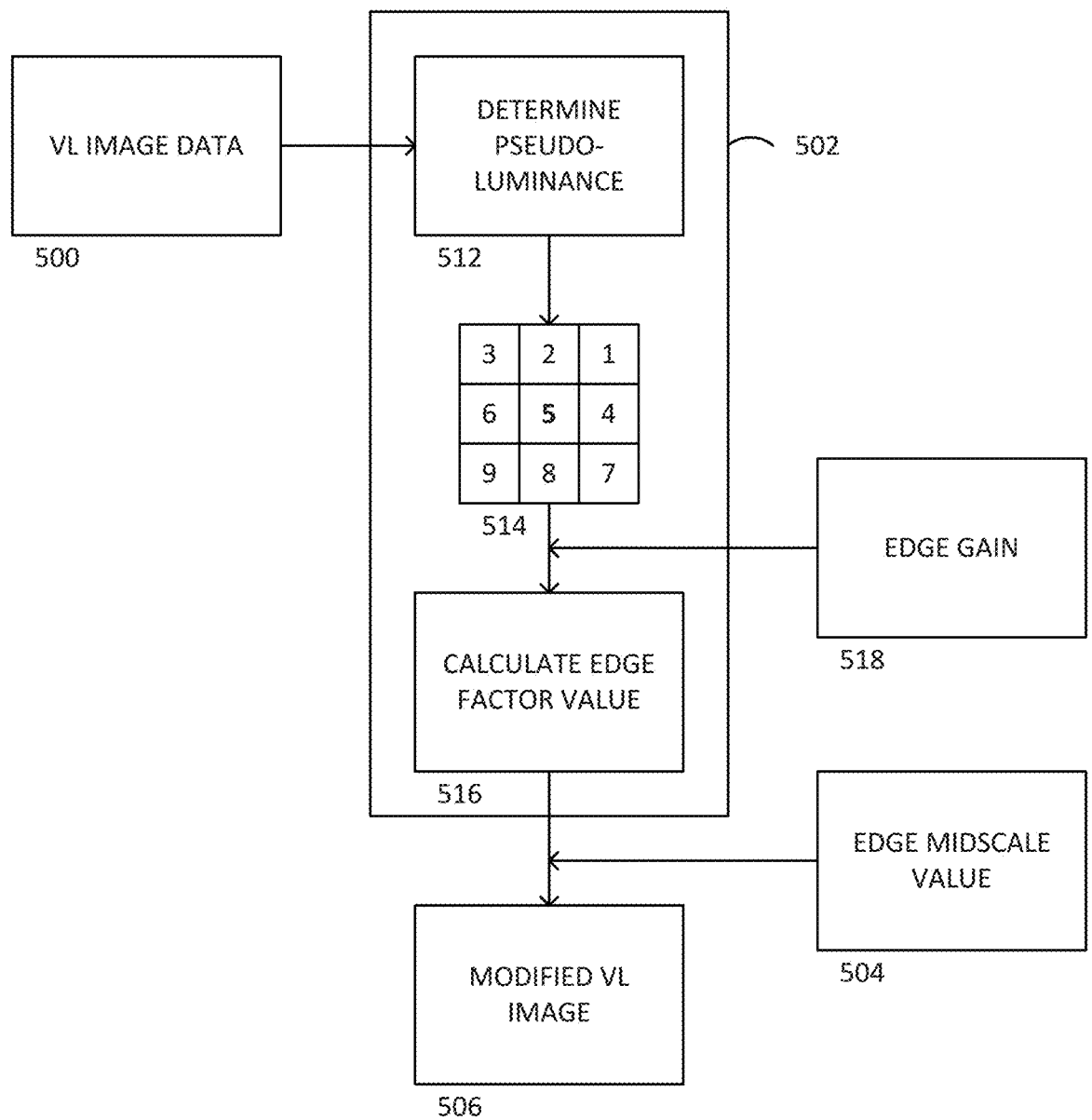
FIGS. 5A and 5B are schematic diagrams illustrating exemplary VL image processing techniques used for generating a modified VL image.

FIG. 5A is a schematic diagram illustrating an exemplary VL image processing technique used for generating a modified VL image. According to the illustrated embodiments, VL image data 500 is directed to a VL processing engine 502. In some embodiments, processing engine 502 can be part of processor 222 or may function separately from processor 222. In some examples, the VL processing engine 502 can determine a pseudo-luminance value 512 for one or more pixels in the VL image. The pseudo-luminance value 512 of a pixel can include the true luminance (i.e., the Y component in the YCbCr representation of the pixel) or any other single-valued scalar representation of the pixel. For instance, in some examples, the pseudo-luminance value 512 for a pixel includes a linear combination of the R, G, and B components of the pixel representation in the RGB color space. In an exemplary embodiment, the pseudo-luminance value for a given pixel, i, can be determined by the equation:

$$\text{PseudoLum}(i) = 4 \times R(i) + 8 \times G(i) + 4 \times B(i)$$

Once a pseudo-luminance value 512 is determined for one or more pixels, a processing kernel 514 may be applied across the VL image, for example, across one or more pixels in the VL image 500. In some examples, the processing kernel 514 can be used to determine an edge factor value 516 for one or more pixels within the kernel that is generally representative of the "strength" of an edge at a given pixel. In some examples, determining the edge factor value 516 may include performing an embossing process for determining a value for each pixel representative of the presence and/or strength of a VL edge at that pixel. With reference to the processing kernel 514 in FIG. 5A, each entry (1-9) in the kernel 514 may correspond to a single pixel in the VL image, and each such pixel may have an associated pseudo-luminance value 512. In other examples, each entry in the processing kernel 514 may correspond to a plurality of pixels within the VL image (e.g., a defined group of pixels such as a square or rectangle that may be averaged together, such as in a filtering or downsampling process). In some embodiments, the processing kernel 514 as illustrated in FIG. 5A may be used to determine an edge factor value (EFV) 516 for the center pixel of the kernel 514. For example, with reference to the illustrated embodiment, the difference in the pseudo-luminance values of diagonally opposite corner pixels may be used to determine the edge factor value of the center pixel. Note that an edge factor value determined by taking a difference between values could be positive or negative. In some examples, the edge factor value 516 may be scaled by a user-adjustable edge gain 518 value. Thus, in an exemplary embodiment, the edge factor value 516 for the center pixel, 5, in the processing kernel 514 can be determined by the equation:

$$EFV(5) = \text{edgeGain} \times [\text{PseudoLum}(1) - \text{PseudoLum}(9)]$$

The resulting edge factor value corresponds to the "strength" of an edge at that pixel. That is, an edge factor value having a large magnitude generally corresponds to a sharp edge or contour within the VL image 500. It will be appreciated that a variety of equations or methods may be suitable for determining an edge factor value 516 of one or more pixels in the processing kernel 514. For example, rather than subtracting associated values for pixels 1 and 9, similar pixel comparison (e.g., subtraction) may be performed for other pairs or groups of pixels. In some embodiments, a user may select which pixels are used for calculating the edge factor value. By doing so, a user may influence how strongly edges in certain directions are reflected in the edge factor values. Similarly, defining which pixels are used in determining the edge factor value may allow a user to ensure that edges in a particular direction are less likely to be missed by the EFV calculation. Exemplary comparisons may include PseudoLum(3)−PseudoLum(7)
PseudoLum(6)−PseudoLum(4)
PseudoLum(2)−PseudoLum(8)

and the like. Additionally, the kernel need not be limited to a 3×3 kernel as shown. Rather, the processing kernel 514 may be any size or shape, such as an n×n square or an m×n rectangle.

In various examples, different equations or methods for determining edge factor values 516 may be best suited for processing kernels of particular size and/or shape. For example, in some embodiments, a plurality of kernel entries may be compared (e.g., via subtraction) and used in determining the EFV. In an exemplary embodiment, a plurality of subtractions may be performed (e.g., opposite corners, top and bottom coordinates, left and right coordinates, etc.) and the subtractions averaged for determining the EFT. In another example, the largest difference magnitude from the set of subtractions is used to determine the EFV. Additionally or alternatively, in some examples, a single processing kernel 514 may be used to determine edge factor values for multiple pixels. Once the processing engine 502 has determined the edge factor value 516 for a pixel, the edge factor value 516 may be combined with the edge midscale value 504 as described above for generating a corresponding pixel in the modified VL image 506. In general, the processing kernel 514 may be moved across the entire VL image in order to determine an edge factor value for each pixel, or may be moved in order to determine an edge factor value for a subset of the pixels in the VL image.

Figure 5B:
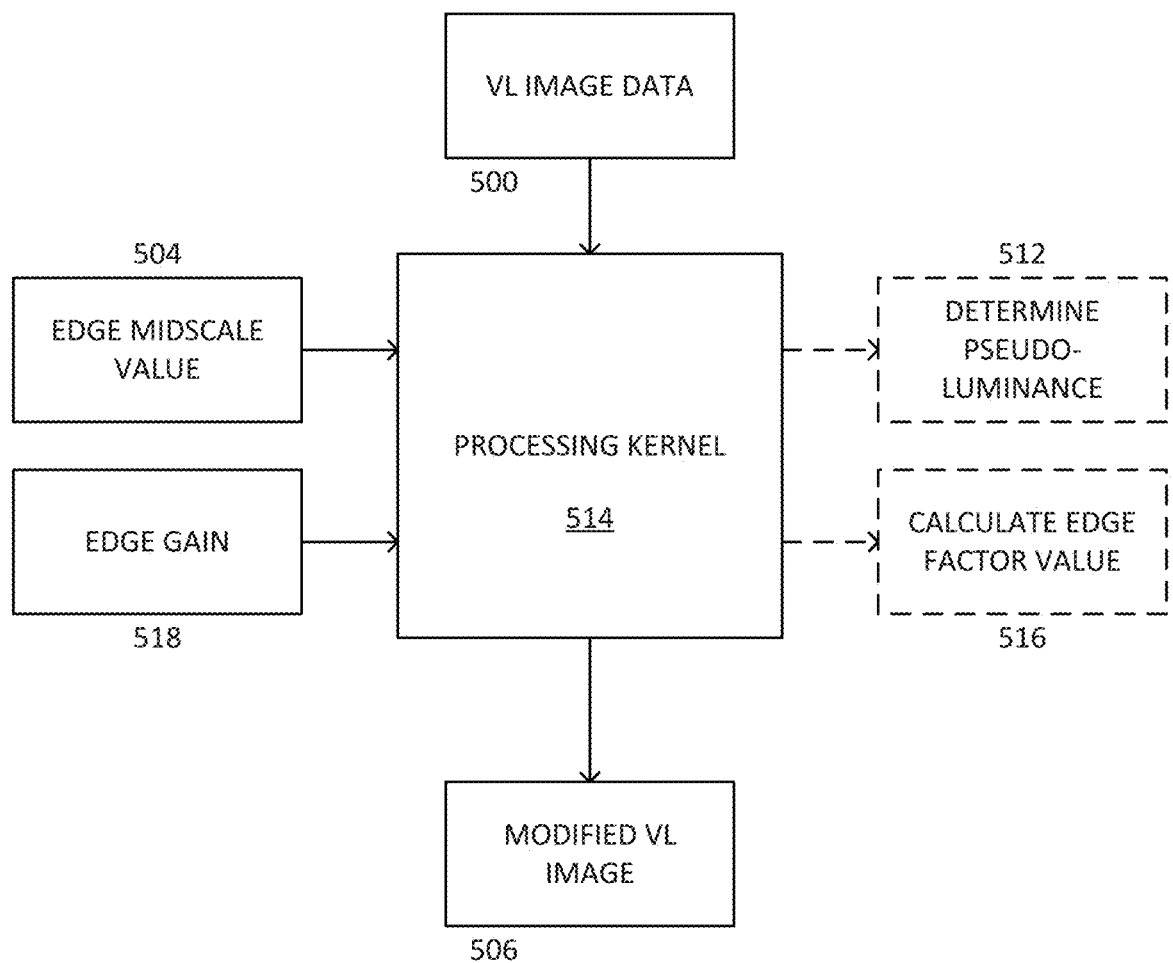

FIG. 5B is a schematic diagram illustrating another exemplary VL image processing technique used for generating a modified VL image. The process of FIG. 5B is similar to that of FIG. 5A, though various steps may be performed differently or in different orders. For instance, in the embodiment of FIG. 5B, the VL image data 500 is processed in processing kernel 514. Similarly to the kernel described above with regard to FIG. 5A, kernel 514 of FIG. 5B may be any size, and may be used to process a subset of VL image pixels at a time.

In the illustrated example of FIG. 5B, the processing kernel 514 receives the edge midscale value 504 and edge gain 518 parameters. The processes shown as being performed in in FIG. 5A may be performed on pixels in the kernel 514 of FIG. 5B. That is, the pseudo-luminance values 512 may be determined for the pixels within the kernel and used in conjunction with the edge gain 518 to determine an edge factor value 516 for one or more pixels within the kernel. The one or more edge factor values determined within the kernel 514 may be combined with the edge midscale value 504 within the kernel 514.

In some such embodiments, the processing kernel 514 may output one or more pixels for inclusion in the modified VL image 506. That is, in some embodiments, a subset of VL image pixels are entered into processing kernel 514, in which processing techniques are performed only on that subset of pixels. The processing may result in one or more pixels for inclusion in the modified VL image 506. After the processing is complete, the kernel 514 may be moved relative to the VL image 500 (or, equivalently, a different subset of pixels of the VL image 500 are applied to the processing kernel 514) for further processing and generating one or more additional pixels for inclusion in the modified VL image 506. The process may be repeated for a plurality of subsets of VL image pixels until the entire modified VL image 506 is constructed.

Figure 6A:
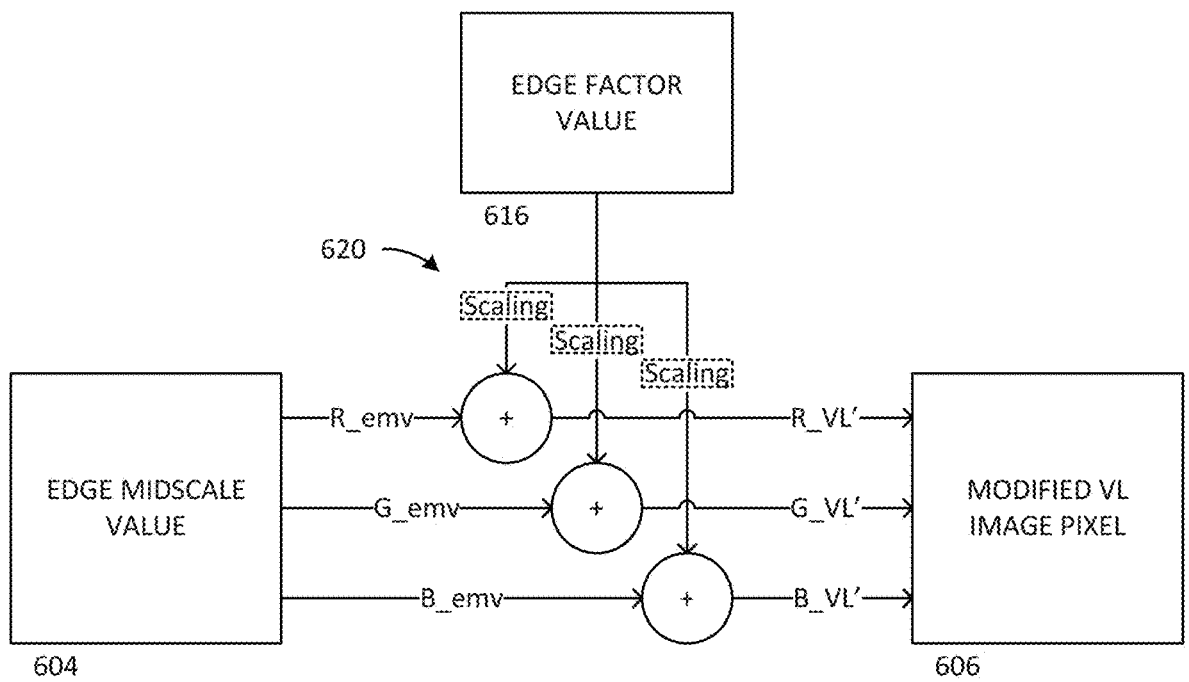
FIG. 6A is a schematic diagram illustrating the combining of an edge factor value with an edge midscale value in RGB color space to determine a modified VL image pixel.

FIG. 6A is a schematic diagram illustrating the combining of an edge factor value with an edge midscale value in RGB color space to determine a modified VL image pixel. In the illustrated embodiment, the edge factor value 616 for a given pixel is combined with each of the R, G, and B values of the edge midscale value 604. In general, the edge midscale value may be any color. In various embodiments, the edge midscale value may be a fixed color stored in memory, or may be definable or otherwise selectable by a user. Since the edge factor value 616 as described above comprises a single value for each pixel, the same edge factor value 616 may be added to each RGB channel of the edge midscale value 604, effectively adjusting the R, G, and B values of the edge midscale value 604 to create the modified VL image 606.

In some examples, the edge factor value 616 needs to be scaled to an appropriate size in order to combine the value with each of the RGB channels. Thus, in the illustrated embodiment, the edge factor value is scaled 620 prior to being added to the various channels. In various embodiments, the number of bits associated with each channel may not be the same. For example, in an exemplary embodiment, the R and B channels may be 5 bits while the G channel may be 6 bits, using 16 bits total. Any number of bits per channel may be used, and any number of channels may have like or different numbers of bits associated therewith.

For a given pixel, adding the EFV 616 to the RGB values of the edge midscale value 604 defines the resulting color for the corresponding pixel in the modified VL image 606. For example, in the illustrated embodiment, the edge factor value 616 is scaled and added to the R channel of the edge midscale value 604 (R_emv), resulting in the R channel of the modified VL pixel 606 (R_VL'). The same is performed for the G and B channels. That is:

$$R\_emv+EFV=R\_VL'$$

$$G\_emv+EFV=G\_VL'$$

$$B\_emv+EFV=B\_VL'$$

wherein the edge factor value may be scaled differently for each channel.

In general, values in the R, G, and B channels are confined to one or more certain ranges. For example, in 24-bit color representation, each of the R, G, and B channels may include 8 bits of information, ranging, for example, between 0 and 255. In other examples, such as a 16-bit color representation, each of the R, G, and B channels may be confined to different ranges. For instance, two channels may be limited to 5 bits (e.g., 0-31) while the third channel is limited to 6 bits (e.g., 0-63). Thus, the sum of an edge midscale value channel and an edge factor value may fall outside of the range (e.g., below zero if the edge factor value is negative or above 255 if the edge factor value is positive). In some examples, this results in saturation of the channel, and the resulting sum is defined to be the limit of the range. For example, if the R channel of the edge midscale value 604 (R_emv) is 240, and the scaled edge factor value 616 to be added to R_emv is 50, $$R\_VL'=R\_emv+EFV=240+50=295 \rightarrow 255$$

That is, even though the sum (295) is above the upper limit of the R_VL' range (255), the resulting value in the modified VL pixel 606 is saturated at the upper limit of the range (255).

Generally, adding the same value (e.g., the edge factor value 616) to each of the R, G, and B channels of a pixel results in a change in the luminance of the pixel while preserving its chrominance. However, as described above, the edge midscale value 604 may be any color. In various embodiments, the edge midscale value 604 may be a specific color programmed into a camera, selectable from a predetermined list, or customizable by a user. Thus, in some situations, the R, G, and B values of the edge midscale value 604 are not necessarily equal. As a result, adding the edge factor value 616 to each of the R, G, and B channels may result in saturation of some channels but not other channels. For example, if R_emv=240, G_emv=100, and B_emv=100, and the edge factor value 616 is 50, then, $$R\_VL'=240+50=295 \rightarrow 255$$

$$G\_VL'=100+50=150$$

$$B\_VL'=100+50=150$$

Thus, in adding the edge factor value 616 to the edge midscale value 604, the R channel became saturated, but not the G or B channels. As a result, the R channel only increased by 15, while the G and B channels increased by 50. Saturation of some but not all channels may result in a difference in chrominance between the edge midscale value 604 and the modified VL image 606.

Figure 6B:
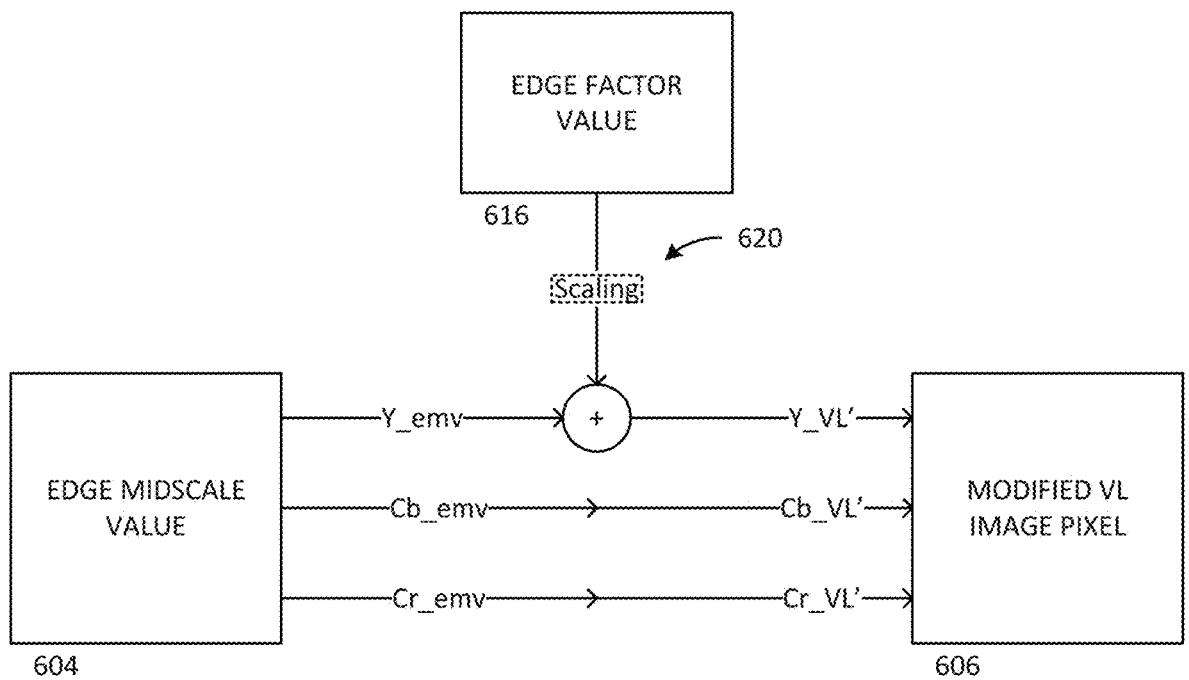
FIG. 6B is a schematic diagram illustrating the combining of an edge factor value with an edge midscale value in YCbCr color space to determine a modified VL image pixel.

FIG. 6B is a schematic diagram illustrating the combining of an edge factor value with an edge midscale value in YCbCr color space to determine a modified VL image pixel. In the illustrated embodiment, the edge factor value 616 is scaled and added to the luminance (Y) channel of the edge midscale value 604 to determine the luminance channel of the modified VL image 606 (Y_VL'). The chrominance channels (Cb, Cr) of the edge midscale value 604 are unaffected by the edge factor value 616, and become the chrominance channels of the modified VL image (Cb_VL' and Cr_VL').

As discussed, adding the edge factor value 616 to the edge midscale value 604 only affects the chrominance of the edge midscale value 604 if one or more, but not all, of the R, G, and B channels of the edge midscale value 604 become saturated. When this is not the case, chrominance of the edge midscale value 604 is unaffected by the adding of the edge factor value 616, as illustrated in FIG. 6B. Thus, the chrominance channels of the edge midscale value 604 become the chrominance channels of the modified VL image.

In some embodiments, the edge midscale value 604 may be a shade of gray, for example, if R_emv=B_emv=G_emv. It will be appreciated that if such values are scaled to different sizes (e.g., 5-bit vs. 6-bit), the values may not be literally equal, though may represent equivalent values relative to their respective bit depths. Thus, as used herein, being "equal" may refer to numbers that are equivalent in value (e.g., relative to the number of bits) without necessarily being equal in size (e.g., the number of bits). In such an embodiment, with reference to FIG. 6A, adding the edge factor value 616 to each channel will not result in saturation of one channel without also saturating the others. That is, each of the R, G, and B channels of the edge midscale value 604 are affected uniformly by the edge factor value. Thus, the chrominance channels of the edge midscale value 604 are unaffected by the edge factor value, and the representation of FIG. 6B applies.

In an exemplary calculation, if R_emv=G_emv=B_emv, then the edge midscale value is gray and Cb_emv=Cr_emv. In an exemplary technique incorporating 24-bit color depth, Cb_emv=Cr_emv=128. Adding the edge factor value 616 to each of the R, G, and B channels of the edge midscale value 604 will not affect the equivalence relationship between the channels, and the chrominance components will be unaffected. Accordingly, after adding the edge factor value 616 to the edge midscale value 604, only the luminance value will be affected. That is:

$$Y\_VL' = Y\_emv + EFV$$

$$Cb\_VL' = Cb\_emv = 128$$

$$Cr\_VL' = Cr\_emv = 128$$

As shown, since the edge midscale value 604 started out in grayscale (R=G=B; equivalently Cb=Cr=128), the resulting modified VL image 606 will also be grayscale. The luminance of the modified VL image 606 will be the luminance component of the edge midscale value 604 offset (plus or minus) by edge factor value 616.

It will be appreciated that, while FIG. 6B has been discussed in terms of a grayscale edge midscale value 604, in some examples, generating the modified VL image 606 may be performed in the YCbCr color space according to the embodiment of FIG. 6B whether or not the edge midscale value 604 is gray. That is, in some examples, the modified VL image 606 may be constructed by adding the edge factor value 616 to the luminance channel of the edge midscale value 604 and defining the chrominance channels of the modified VL image 606 to be equal to the chrominance channels of the edge midscale value 604.

Various combinations of an edge factor value 616 and a generic (e.g., gray, or any color that may be programmed into memory or selected by the user) edge midscale value 604 have been described. It will be appreciated that the combination may be performed in a variety of ways in any appropriate color space. RGB and YCbCr color spaces are described herein by way of example, but similar methods may be performed using, for example, CYMK, HSL, or HSV color space representations. Adding the edge factor value 616 to an edge midscale value 604 may be done in a single channel (e.g., the luminance channel in FIG. 6B) or a plurality of channels (e.g., each of the R, G, and B channels in FIG. 6A).

While shown in FIGS. 6A and 6B as being a scalar value added to one or more channels of the edge midscale value, various other options are possible. For example, with reference to FIG. 6A, in some embodiments, the edge factor value may be added to fewer than all of the R, G, and B channels, such as according to the selection of a user. In doing so, pixels enhanced by large-magnitude edge factor values may be selectively shifted toward a certain color in the modified VL image. Similarly, with reference to FIG. 6B, the edge factor value may be added to one or more chrominance channels, in addition to or instead of the luminance channel, of the edge midscale value.

In some embodiments, the edge factor value may be a multi-channel color value as opposed to a single scalar value. For example, instead of converting the VL image to a scalar pseudo-luminance value prior to determining the edge factor value, the same processing techniques may be performed on one or more color channels of the VL image. As a result, the edge factor value may comprise a plurality of color channels for combining with the edge midscale value. Combining of pixels in multiple color channels can be performed in a variety of ways (e.g., addition, blending, etc.).

In other embodiments, scalar edge factor values may be determined such as described above, but scalar values may be mapped to a multiple-channel color space representation. Such a mapping may be performed in a variety of ways. In some embodiments, scalar edge factor values are effectively palettized in a similar way to palettization schemes of IR image data. The resulting multi-channel edge factor values may be combined with multiple channels of the edge midscale value to generate the modified VL image. In some such examples, the EFV color palette may be chosen to be complementary to the IR palettization scheme. Examples may include a grayscale IR image with an amber EFV palette in order to ultimately show visible edges as a degree of amber (yellow/red) within a grayscale IR image. In some embodiments, both palettization schemes are selectable by a user. In other embodiments, a user may select one of such palettization schemes and a complementary palettization scheme is automatically used for the other. In some examples, while both palettization schemes may be selectable by a user, the user may be alerted via the user interface, after the selection of one palettization scheme, of possible complimentary palettization schemes.

The result of the combination is a modified VL image 606 in which each pixel includes the edge midscale value 604 affected by the edge factor value of the corresponding pixel from the VL image. As noted above, the magnitude of the edge factor value 616 generally corresponds to the "strength" of an edge at a corresponding VL pixel. As such, the resulting modified VL image 606 generally includes the edge midscale value 604 offset by the edge factor value, and wherein pixels corresponding to edges in the VL image are most affected by the addition of the edge factor value 616. Accordingly, pixels corresponding to the edges of the VL image are generally the most departed from the edge midscale value 604 in the modified VL image 606.

Figure 7A:
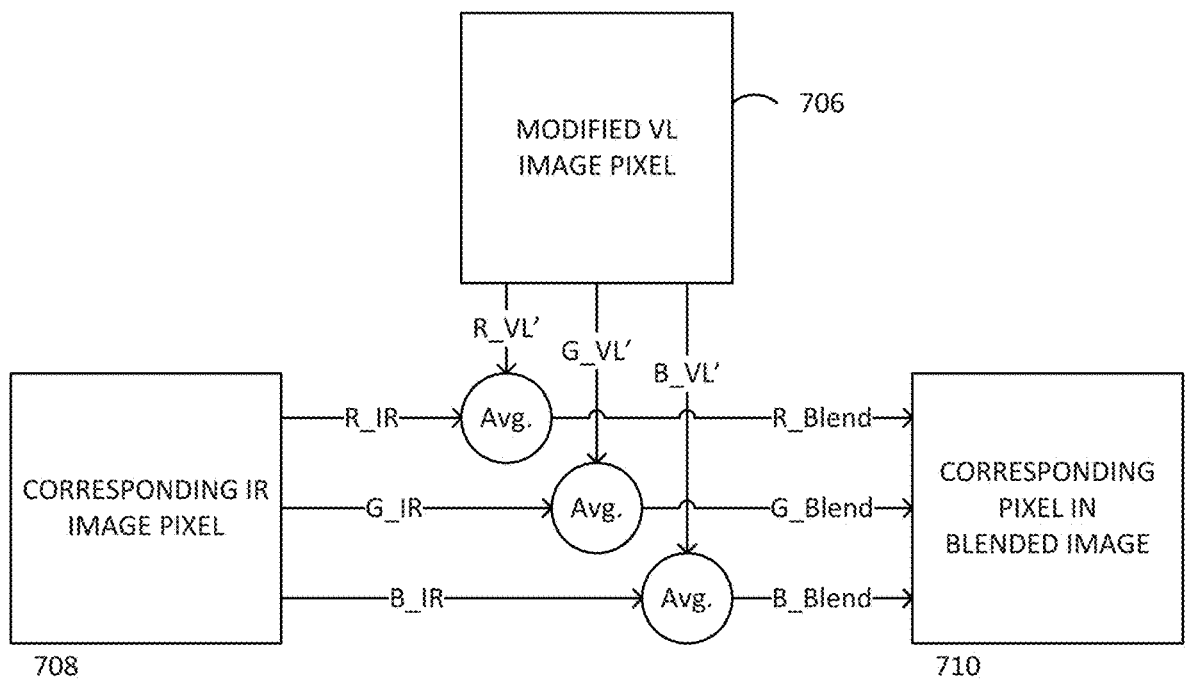
FIGS. 7A and 7B are schematic diagrams illustrating exemplary techniques for combining the modified VL image and a corresponding IR image.
Figure 7B:
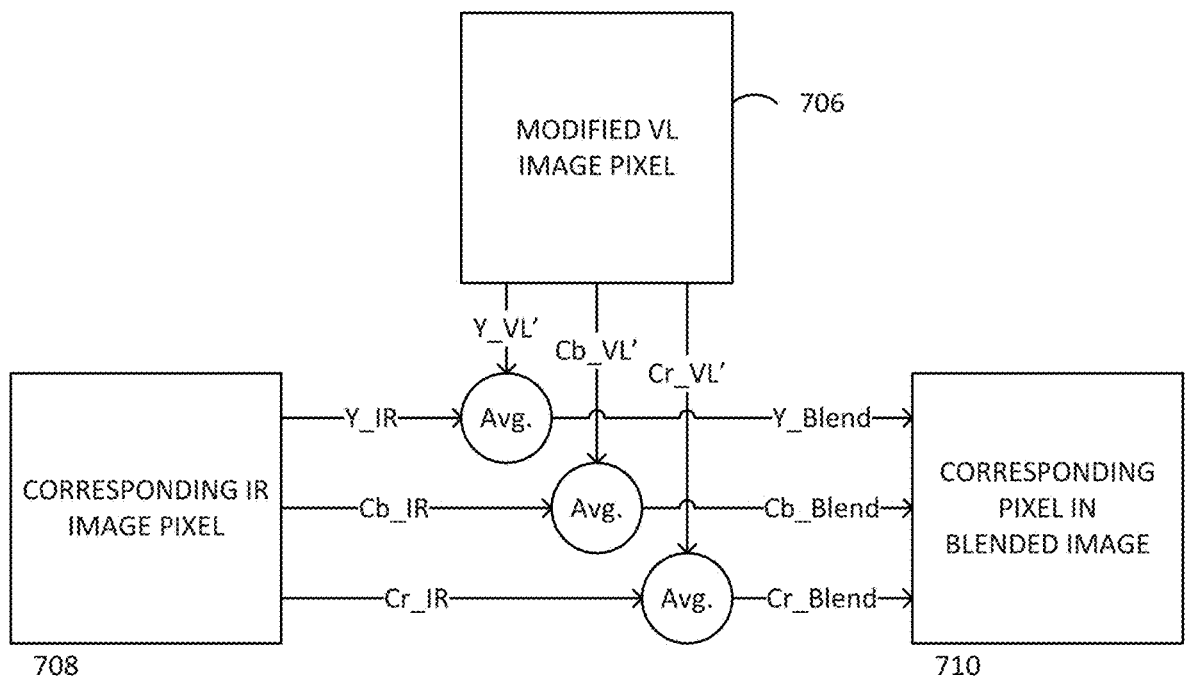

With reference to FIG. 4, the modified VL image 406 may be combined with a corresponding IR image 408 to create a blended final image 410. FIGS. 7A and 7B are schematic diagrams illustrating exemplary techniques for combining the modified VL image and a corresponding IR image. As shown in FIG. 7A, the R, G, and B channels of a pixel in the modified VL image are averaged with the respective R, G, and B channels of a corresponding IR image pixel. The RGB values associated with pixels in the IR image 708 may be defined according to a palettization scheme, in which pixels are assigned to colors within a palette based on associated IR image data. As described above, corresponding pixels need not have a one-to-one relationship, but rather can include one or more pixels in the IR image 708 corresponding to one or more pixels in the modified VL image 706.

Averaging can include alpha-blending, in which a weighting factor determines the contribution from each of the IR 708 and modified VL image 706 pixels. In an exemplary blending procedure, for a blending ratio, alpha (α), $$R\_Blend = \alpha \times R\_IR + (1-\alpha) \times R\_VL'$$

$$G\_Blend = \alpha \times G\_IR + (1-\alpha) \times G\_VL'$$

$$B\_Blend = \alpha \times B\_IR + (1-\alpha) \times B\_VL'$$

The blending ratio may be user-selectable or adjustable to enable a user to select the amount of blending. As previously described, in some embodiments, alpha can range from 0 to 1 (i.e., 0% IR to 100% IR). In other embodiments, there may be a minimum and/or maximum blending ratio between 0 and 1. In various embodiments the blending ratio may be constant among all pixels in the image, or may vary from pixel to pixel. In general, the edges from the VL image emphasized by the VL image processing and present in the modified VL image will be accentuated in and effectively enhance the blended image.

In some embodiments, the blending ratio for each pixel may be determined automatically based on one or more parameters. In some examples, the blending ratio for each pixel may be a function of the edge factor value (e.g., 616) associated with that pixel. For example, the blending ratio may vary inversely with the magnitude of the edge factor value. That is, if the magnitude of the edge factor value for a pixel in the VL image is small, the blending ratio may be large, resulting in a corresponding pixel in the blended image 710 with a relatively large contribution from the corresponding IR pixel 708. On the other hand, if the magnitude of the edge factor value for a pixel in the VL image is large, the blending ratio may be comparatively small, resulting in a corresponding pixel in the blended image with a small contribution from the corresponding IR pixel.

The result is a blended image 710 in which pixels not corresponding to edges in the VL image (i.e., a low edge factor value magnitude) have a large contribution from the IR image. By contrast, pixels corresponding to edges in the VL image (i.e., a large edge factor value magnitude) will have stronger contributions from the modified VL image. As a result, pixels that do not correspond to edges in the VL image appear similar to the corresponding IR pixels from the corresponding IR image.

In an exemplary embodiment, when the edge factor value is below a certain threshold, the blending ratio, α, is set to 1. That is, the when there are no edges (or edges below a predetermined or user-adjustable threshold "strength") in a pixel in the VL image, the corresponding pixel in the blended image is 100% the corresponding pixel in the IR image 708. Such pixels retain the RGB values from the original IR image 708, and are therefore recognizable on the original RGB palette. By contrast, the "stronger" the edge in the VL image, the greater the contribution of the modified VL image 706 to the blended image 710. The colors of the pixels corresponding to "stronger" edges are affected more by blending than non-edges, and generally do not retain the same RGB values from the original IR image. Thus, the edges emphasized by the VL image processing process can be easily seen in the blended image 710 due to the blended contribution of the modified VL image 706.

In other embodiments, the blended image 710 will include a minimum amount of IR image contribution and a minimum amount of VL image contribution. For example, the blending ratio, α, may be precluded from being at least one of 0 and 1, but instead may be limited to a smaller range of values. It will be appreciated that any limitations on the blending ratio are possible. In addition, other blending schemes may be employed. For example, the blending ratio may reflect the amount of VL image contribution to the blended image instead of the amount of IR image contribution. In some such embodiments, the blending ratio may be a function of the edge factor value, and may increase with increasing edge factor values.

It will be appreciated that, additionally or alternatively, the blending ratio for each pixel may be a function of other parameters, such as parameters of the IR image pixel. For example, in some embodiments, the blending ratio for a given pixel is a function of a magnitude of the pixel in the IR image data (e.g., a scalar value such as a luminance or pseudo-luminance or one or more of associated R, G, or B values in the palettized IR image). In such examples, various aspects of the thermal scene may contribute to determining the amount of IR image information and modified VL image information is imported into the blended image. In some examples, the blending ratio as described above may be inversely related to an IR pixel magnitude, or similarly, the temperature of the target scene represented by the IR pixel. That is, in some embodiments, a blended image may include a larger contribution of the modified VL image at higher temperatures than lower temperatures, generally emphasizing visible edges in the higher-temperature regions. It will be appreciated that, in general, individual pixel blending ratios dependent on IR intensity may have any functional relationship with the IR intensity values, such as having higher temperature, lower temperature, or a certain range of temperature including a higher or lower modified VL image contribution to the blended image.

While a variety of blending techniques have been described, the overall blending ratio may be determined based on a combination of these. For example, the overall blending ratio for a given pixel may be a combination of blending ratio determined by parameters such as the edge factor value and the intensity of corresponding IR pixels. In further embodiments, such pixel-dependent blending ratios may also be modified by an adjustable global blending radio. In an exemplary embodiment, blending ratios, $\alpha\_i$, are defined per pixel based on the corresponding edge factor value ($\alpha\_EFV$) and the corresponding IR pixel intensity ($\alpha\_IR$), as well as a global blending ratio ($\alpha\_global$). The overall blending ratio for a given pixel may include a combination of such blending ratios, such as a weighted average:

$$\alpha\_net = c\_1 \times \alpha\_EFV + c\_2 \times \alpha\_IR + c\_3 \times \alpha\_global$$

wherein c1, c2, and c3 are weighting factors. In various embodiments, any parameters involved in the blending process, such as the blending options (e.g., EFV- and/or IR-dependent), values (e.g., global blending) or the relative contribution of each blending technique (e.g., c_i) may be selectable or adjustable by a user.

It should be noted that, in some embodiments, other factors may be dependent on the IR image intensity in order to selectively emphasize details in areas having certain thermal characteristics. For instance, the edge gain value used in determining edge factor values for VL image pixels may be dependent on the IR image data for corresponding IR image pixels. That is, VL edges emphasized by the VL image processing may be more or less emphasized due to the thermal characteristics of a corresponding portion of the target scene. Accordingly, pixels in the blended image having a certain thermal profile (e.g., high temperature, low temperature, within a temperature range, etc.) may include more strongly emphasized edges than other pixels.

FIG. 7B illustrates an exemplary blending process in YCbCr color space. In the illustrated embodiment, the luminance, Y, and the chrominance, Cr and Cr, channels of a modified VL image pixel 706 are averaged with corresponding channels of a corresponding IR image pixel 708. As described above, averaging may include weighted averaging using a blending ratio, α. Similar to the RGB blending, in an exemplary blending process, $Y\_Blend=\alpha \times Y\_IR+(1-\alpha)\times Y\_VL'$ $Cb\_Blend=\alpha \times Cb\_IR+(1-\alpha)\times Cb\_VL'$ $Cr\_Blend=\alpha \times Cr\_IR+(1-\alpha)\times Cr\_VL'$ As described above with regard to blending in the RGB color space, for a given pixel, the blending ratio, α, may be a function of the edge factor value associated with the corresponding VL pixel.

As described with regard to FIG. 6B, in some instances, the chrominance components of the modified VL image pixel (Cb_VL', Cr_VL') may correspond to the chrominance components of the edge midscale value (Cb_emv, Cr_emv). In some such instances, the chrominance components of a pixel in the blended image 710 may include a weighted blend of the chrominance of the IR image pixel 708 and the chrominance components of the edge midscale value. Additionally, in some such instances, the luminance component of the modified VL image pixel (Y_VL') is the luminance component of the edge midscale value offset by the edge factor value associated with the corresponding VL image pixel. Accordingly, the luminance component of a pixel in the resulting blended image 710 may include a weighted blend of the luminance component of the corresponding IR pixel 708 and the luminance component of the edge midscale value offset by the edge factor value. It will be appreciated that, while two examples are given in FIGS. 7A and 7B, the blending processes such as those described may be performed in any appropriate color space.

In some examples, none of the images are palettized until the final blended image. That is, the VL image may be converted into a scalar pseudo-luminance value used to determine a scalar edge factor value. The scalar edge factor value may be combined with a gray edge midscale value to create a modified VL image having essentially scalar pixel values. These values may be combined with scalar (grayscale) IR image data to generate scalar values for pixels in the blended image. A single palettization scheme may be applied to the scalar blended image to create a colorized image.

In a similar embodiment, pseudo-luminance values may be used to determine a scalar edge factor value. The scalar edge vector value may be combined with a gray edge midscale value to create a modified VL image having essentially scalar pixel values. The resulting modified VL image may then be palettized according to any appropriate palettization scheme prior to blending with grayscale or color-palettized IR image data.

Figure 8A:
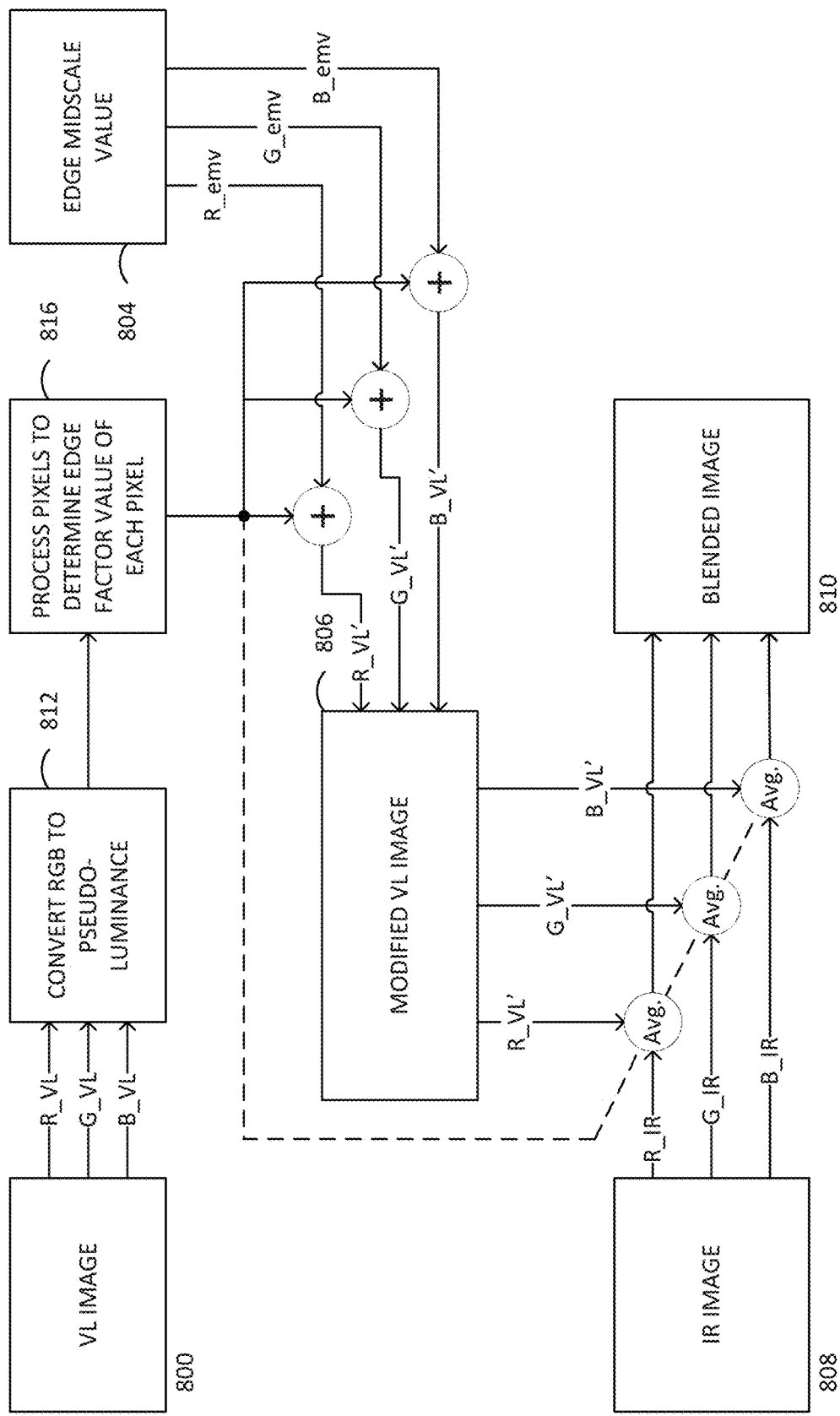
FIGS. 8A and 8B are schematic diagrams illustrating a process for generating a blended image.
Figure 8B:
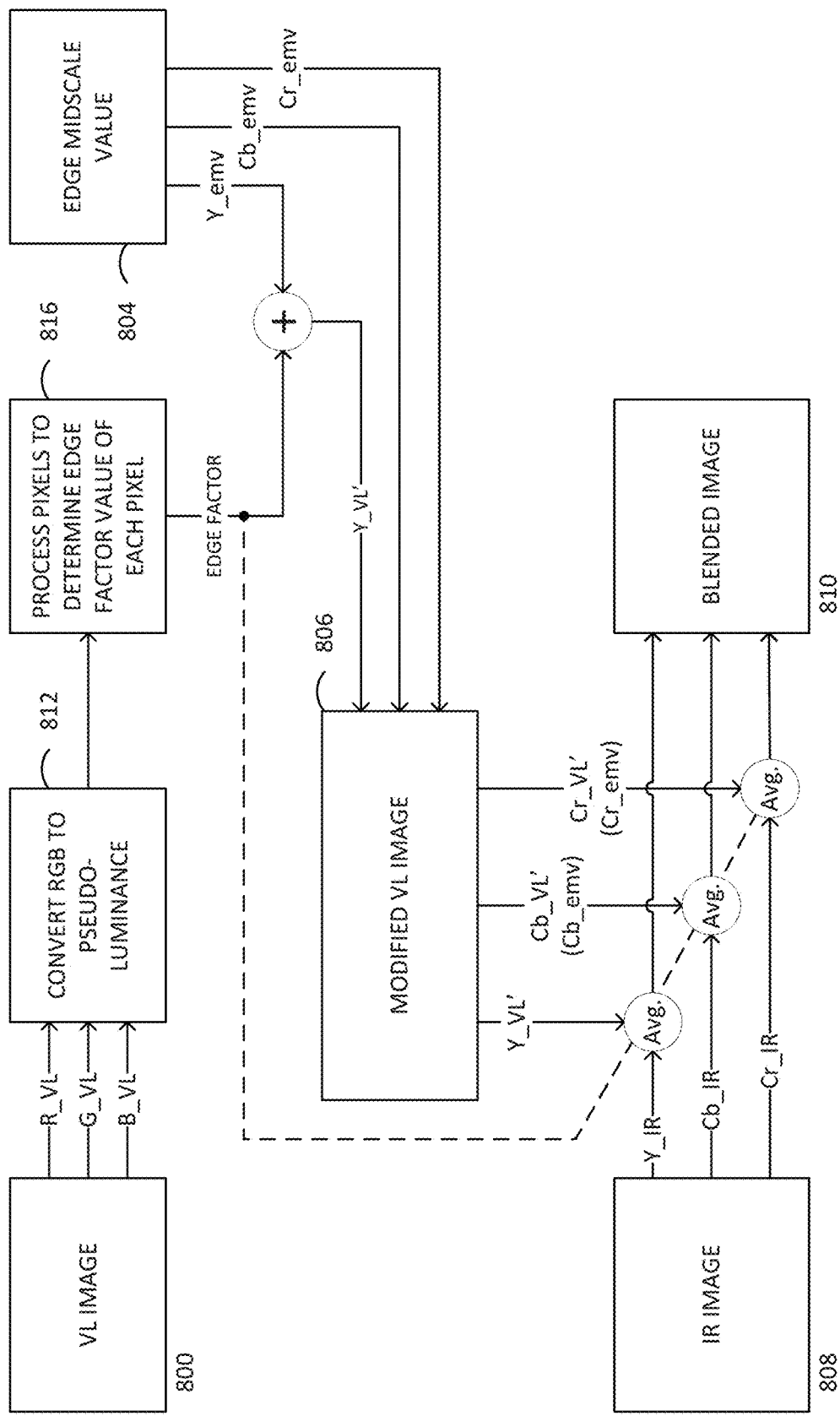

FIGS. 8A and 8B are schematic diagrams illustrating a process for generating a blended image. In FIGS. 8A, R, G, and B channels of a VL image 800 (R_VL, G_VL, B_VL) are converted into a pseudo-luminance 812 (Y'). Pseudo-luminance values 812 are processed to determine an edge factor value 816 for each pixel, for example, as described above with reference to FIG. 5A. In the illustrated example of FIG. 8A, the edge factor value 816 is combined with each of the R, G, and B channels (R_emv, G_emv, and B_emv, respectively) of an edge midscale value 804, for example, as described above with reference to FIG. 6A, to generate a modified VL image 806 with channels R_VL', G_VL', and B_VL'. As described above, the combination of the edge factor value 816 with the edge midscale value 804 generally emphasizes pixels corresponding to edges present in the VL image 800.

The R, G, and B channels of the modified VL image 806 (R_VL', G_VL', B_VL') are averaged with corresponding R, G, and B channels of the IR image 808 (R_IR, G_IR, B_IR) to generate the blended image 810. Blending can be performed as described, for example, with reference to FIG. 7A. In some embodiments, the averaging may include a weighted average using a blending ratio, α, as described above. In some such embodiments, the blending ratio for each pixel may be dependent on the edge factor value 816 associated with a corresponding VL pixel, as illustrated by the broken lines in FIG. 8A. The resulting blended image 810 generally includes IR image information and emphasized edges from the contribution of the modified VL image.

FIG. 8B is a schematic diagram illustrating a blending process in which the blending is performed in YCbCr color space. The process illustrated in FIG. 8B is similar to that of FIG. 8A, in which the R, G, and B values of the VL image 800 are used to determine a pseudo-luminance value 812. It will be appreciated that other methods for determining pseudo-luminance values using other color space values of the VL image 800 may be used. Pseudo-luminance values 812 are used to determine an edge factor value 816 for each pixel. In the illustrated embodiment, as described above with reference to FIG. 6B, the luminance component (Y_emv) of the edge midscale value 804 may be combined with the edge factor value in order to determine the luminance component of the modified VL image 806. The chrominance components of the edge midscale value 804 (Cb_emv, Cr_emv) may be unaffected by the edge factor value and generally used as the chrominance components of the modified VL image.

As shown, the Y, Cb, and Cr components of the modified VL image 806 are averaged with corresponding components of the IR image 808, for example, as described above with reference to FIG. 7B. In such an embodiment, the resulting blended image 810 includes chrominance values that are a blend of the chrominance values of the edge midscale value 804 and the IR image 808. However, the luminance component of the blended image 810 includes the luminance component of the IR image 808 and the luminance component of the edge midscale value 804 offset by the edge factor value 816. Thus, edge factor values 816 representative of edges from the VL image 800 are reflected in the luminance channel of the blended image 810 and may therefore be visible in the blended image 810. As described above, in some examples, the blending ratio of the IR and modified VL images at a given pixel may be a function of the edge factor value associated with a corresponding pixel in the VL image as illustrated by the broken lines in FIG. 8B.

In general, as described above with reference to FIG. 5A, the edge factor value for a given pixel of the VL image may correspond to the "strength" of an edge at that pixel. According to some embodiments as described above, the edge factor value may be used to generate the modified VL image, which is then blended with the IR image. As a result, the "strength" of edges in the VL image is ultimately represented in the blended image. This provides for added clarity and context of items in the imaged scene in the resulting blended image.

Figure 9A:
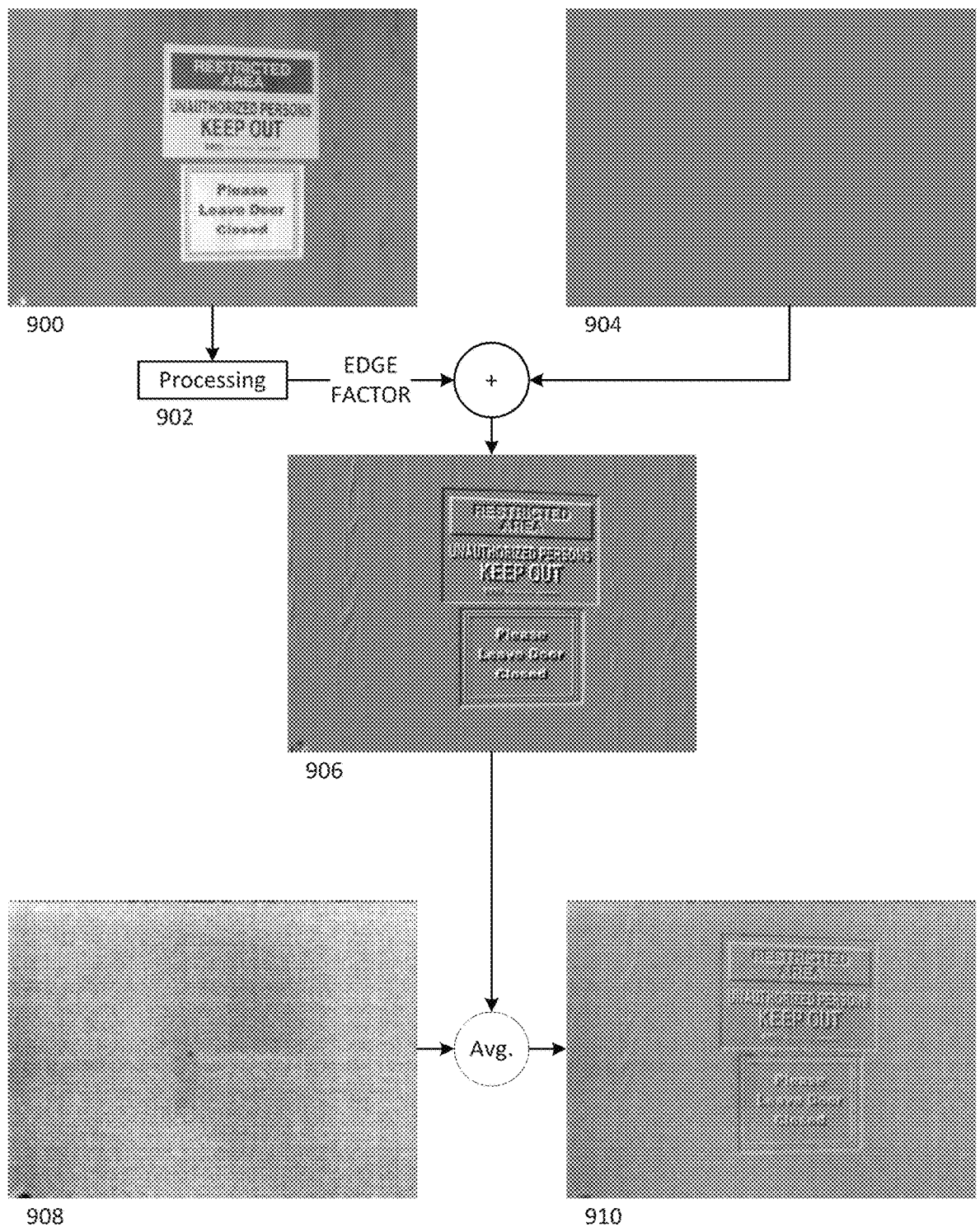
FIGS. 9A and 9B are a flow diagram showing a series of example images used in creating a blended image.

FIG. 9A is a flow diagram showing a series of example images used in creating a blended image. As shown, a VL image 900 is processed 902 to determine edge factor values associated with the VL pixels. In the illustrated embodiment, the VL image 900 is shown in grayscale. In some examples, the scalar grayscale values of the grayscale pixels may be used as pseudo-luminance values described elsewhere herein. That is, in some such examples, determining a pseudo-luminance value may be implicitly built in to the VL image.

The edge factor value is then combined with an edge midscale value 904 to create a modified VL image 906. As shown, the modified VL image 806 appears to be similar to the edge midscale value 904, but darkened or lightened at various locations corresponding to edges seen in the VL image 900. According to some embodiments, a greater departure from the edge midscale value 904 corresponds to a larger edge factor value (i.e., a "stronger" edge). Thus, the VL image processing (e.g., determining the edge factor value and combining with the edge midscale value) causes edges within the VL image to stand out from a background that is approximately the edge midscale value 904 in the modified VL image 906. As described above, in some examples, the edge factor value includes a user-adjustable edge gain parameter, allowing a user to adjust the amount the edges stand out due to the VL image processing.

The resulting modified VL image 906 is subsequently blended with a corresponding IR image 908 to produce a blended image 910. In the illustrated embodiment, the IR image 908 is representative of a generally uniform thermal scene. That is, there is little temperature variation across the scene. As a result, the IR image 908 is generally constant across the entire image. However, because of the blending of the IR image 908 and the modified VL image 906, the edges emphasized in the modified VL image 906 are visible in the blended image 910. Additionally, the blended image 910 includes information from the IR image 908 as well. That is, it is apparent in the blended image 910 that the thermal scene is relatively uniform due to little variation outside of the enhanced edges. In addition, it will be appreciated that while the illustrated example demonstrates the IR image being represented by a grayscale palette, any palettization scheme may be used. Similarly, while the VL image is shown in grayscale, other known VL visualization schemes may be used.

In general, the combination of the IR image data with the modified VL image data will tend to preserve at least relative temperature information between pixels in the blended image in locations having similar edge factor values (e.g., locations having few or no VL edges). Because the modified VL image data is generally the edge midscale value modified by the edge factor value, only those pixels corresponding to edges in the VL image depart significantly from the edge midscale value in the modified VL image 906. Accordingly, additional detail from the VL image 900 (e.g., colors or gradual shifts in color or shading, such as due to variations in scene illumination or light intensity, etc.) does not obscure IR image data when creating the blended image 910. Instead, in some embodiments, pixels not corresponding to strong edges in the VL image (and thus having an associated edge factor value having a low magnitude) are generally represented by the edge midscale value 904 in the modified VL image 906. Such pixels in the modified VL image 906 therefore have similar effects on corresponding IR pixels due to the blending process, and the relative relationship between IR pixels with respect to the original IR palette is generally maintained.

As described above, in some embodiments, the blending ratio for combining the modified VL image 906 and the IR image 908 at each pixel is a function of the edge factor value associated with the corresponding VL pixel. Thus, in some such embodiments, pixels in the blended image 910 not corresponding to strong edges in the VL image 900 may largely or entirely include the IR image data, thereby entirely or nearly entirely preserving the IR image information at pixels corresponding to no or weak edges in the VL image 900. By contrast, pixels corresponding to edges in the VL image 900 (having a high-magnitude edge factor value) will include the modified VL image data incorporating such edge factor values. Thus, the edges in the VL image corresponding to pixels having edge factor values of a large magnitude will ultimately be incorporated into the blended image 910 by way of the edge factor value contribution to the modified VL image 906.

Figure 9B:
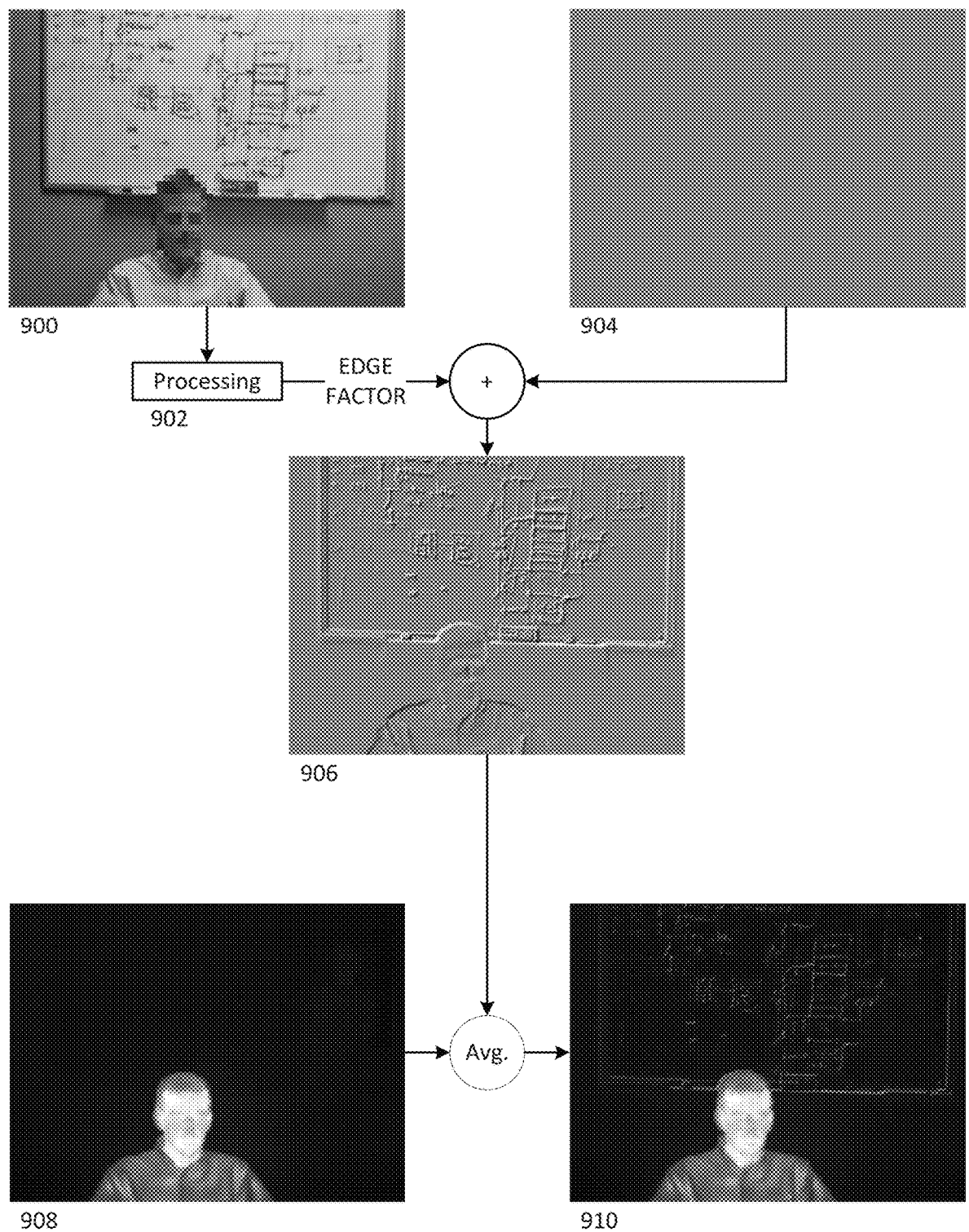

FIG. 9B is another flow diagram showing a series of example images used in creating a blended image. Generally, the process follows as described above with respect to FIG. 9A, in which the VL image 900 is processed and combined with the edge midscale value 904 to generate a modified VL image 906. The modified VL image 906 includes edges showing the outline of a person as well as background details (whiteboard and writing). The modified VL image 906 is combined with the IR image 908 to create a blended image 910. While the thermal scene represented in FIG. 9A is relatively uniform, the thermal scene represented in FIG. 9B includes thermal variations. That is, the IR image 908 of FIG. 9B includes contents having a wide variety of temperatures (a relatively uniform background with higher-temperature person in the foreground). As shown, the blended image 910 of FIG. 9B includes both the thermal information from IR image 908 (the person stands out from the background) as well as visible details from the VL image (the whiteboard and writing details). Thus, the resulting blended image 910 effectively combines thermal information from the IR image data as well as edges and detail information from the VL image data.

Figure 10:
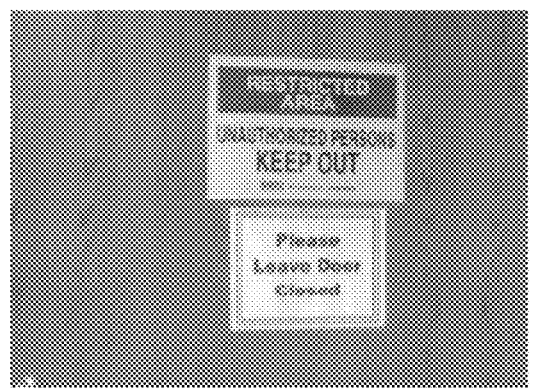
FIG. 10 is a series of images illustrating adjustability of edge gain parameters.
Figure 10:
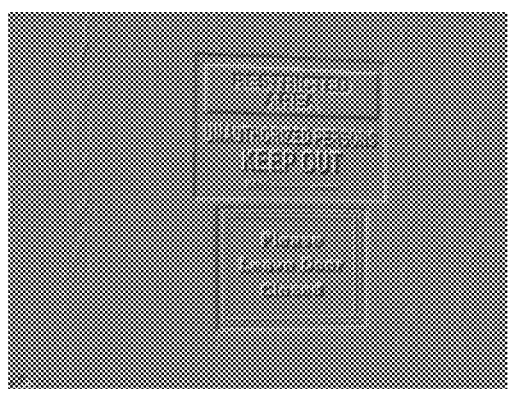
Figure 10:
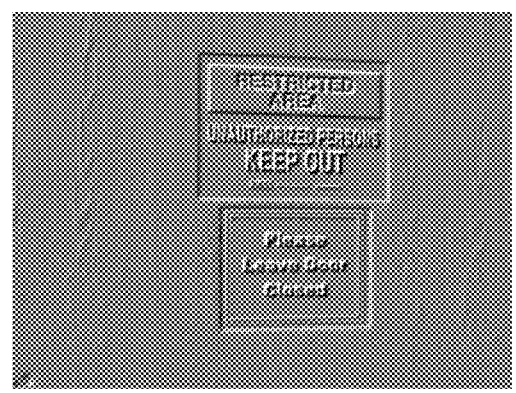
Figure 10:
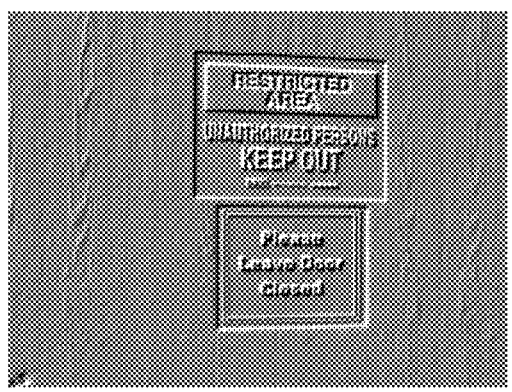
Figure 10:
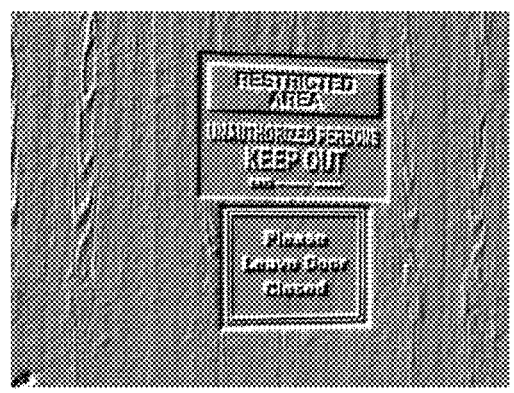

As previously described, the VL image processing may include an adjustable (e.g., user adjustable) edge gain parameter. Thus, the resulting modified VL image may include an adjustable amount of offset or other enhancement at pixels corresponding to VL edges. FIG. 10 provides a series of modified VL images including adjusted edge gain parameters. As discussed previously, the VL image 1000 may be processed to generate edge factor values for each pixel which may depend on an edge gain parameter. Modified VL images 1006a, 1006b, 1006c, and 1006d are exemplary images resulting from VL image processing having different edge gain parameters. For example, image 1006a is created using a relatively small edge gain parameter, with low but visible contrast present between pixels corresponding to VL edges and those not corresponding to VL edges. By contrast, image 1006b is a modified VL image generated using an edge gain parameter that is larger than that of image 1006a, and the resulting image 1006b includes increased visible contrast at pixels corresponding to VL edges. Similarly, image 1006c is a modified VL image generated with a still larger edge gain parameter when compared to image 1006b. Accordingly, pixels corresponding to VL edges are further emphasized in image 1006c when compared to images 1006a and 1006b. Image 1006d is a modified VL image generated using a still greater edge gain parameter than image 1006c, therefore having even further offset and/or enhanced pixels corresponding to VL edges.

In various embodiments, a user may adjust the edge gain parameter in order to affect the degree of enhancement of pixels corresponding to VL edges, for example, via a user interface. In some embodiments, the user may adjust the edge gain parameter in real time and observe the effect of the adjustment on the display. In some examples, the edge gain parameter may be selectable from a list of predetermined values or percentages. In other examples, the edge gain parameter may be continuously adjusted between minimum and maximum values.

Figure 11:
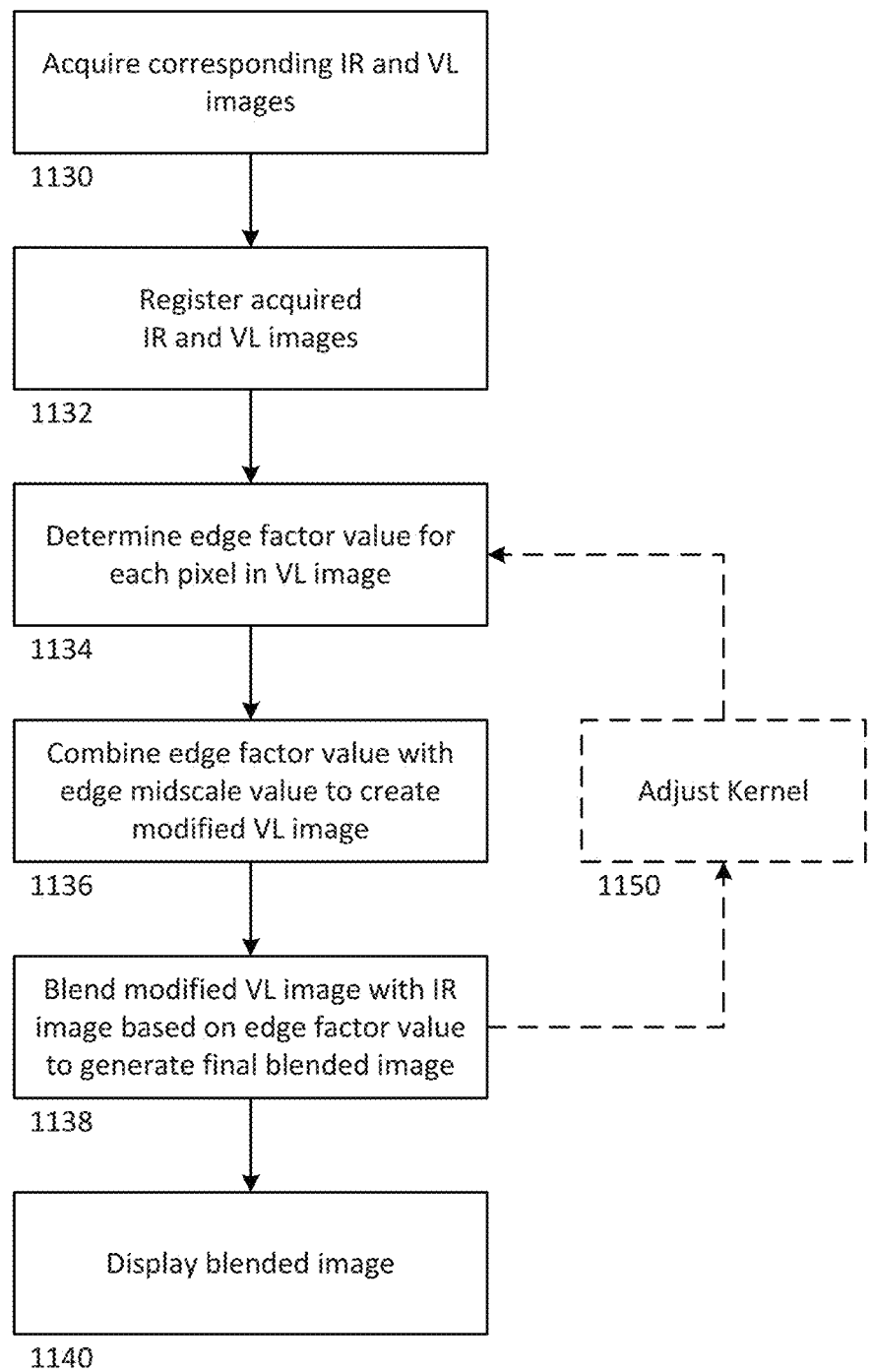
FIG. 11 is a process-flow diagram illustrating an exemplary process for creating a blended image.

FIG. 11 is a process-flow diagram illustrating an exemplary process for creating a blended image. One or more cameras may be used to acquire corresponding IR and VL images (1130). The images may be captured by the same or different cameras, and may be subsequently processed and/or analyzed on one or both of the cameras, or transferred to an external processing device. The method can include registering the acquired IR and VL images (1132). As previously discussed, one or both of the IR or VL images may be scaled (upsampled, downsampled, etc.) to achieve a one-to-one pixel mapping between the images. Additionally or alternatively, in some examples, a plurality of pixels in one of the images may correspond to a single pixel or a different-sized plurality of pixels in the other image. Next, an edge factor value may be determined for each pixel in the VL image (1134). The determined edge factor values from a plurality of pixels can be added to or otherwise combined with an edge midscale value in order to create a modified VL image (1136). Finally, the method can include blending the modified VL image with the IR image in order to generate a final blended image (1138). In some examples, the blending may be performed on a pixel-by-pixel basis, with the blending ratio at each pixel being based on the edge factor value associated with that pixel. As previously described, in some examples, pixel processing is done on an entire-image scale, in which edge factor values are combined with an entire "frame" of the edge midscale value. In alternative embodiments, several processing steps may be performed on a subset of pixels within the processing kernel. Accordingly, in some embodiments, after performing a series of processing steps the step of moving the kernel (1150) may be performed. As shown by the broken lines, in an exemplary process, modified VL image pixels may be blended with corresponding IR pixels (1138) for pixels within the processing kernel. Then the processing kernel may be adjusted (1150) to perform processing steps (e.g., 1134-1138) on a new set of pixels. After generating the blended image (1138), the method can include displaying the blended image (1140), for example on display 108.

In various examples, the display of the blended image may take a variety of forms. For instance, in some examples, the entire displayed image includes a blended image having a combination of IR image data and modified VL image data. In other examples, the blended image may be presented within a larger VL image, for example, in a picture-in-picture display. In general, the blended image may be presented in any way appropriate for presenting IR image data on a display, such as those described, for example, in U.S. patent application Ser. No. 12/828,442, filed Jul. 1, 2010, and entitled "THERMOGRAPHY METHODS," U.S. Pat. No. 7,994,480, filed Jul. 19, 2006, and entitled "VISIBLE LIGHT AND IR COMBINED IMAGE CAMERA," and U.S. patent application Ser. No. 13/833,853, filed Mar. 15, 2013, and entitled "THERMAL IMAGE ANIMATION," each of which is assigned to the assignee of the instant application and is hereby incorporated by reference herein in its entirety.

Methods as described herein may be performed in a variety of ways. In some examples, image processing and blending techniques may be carried out, for example, by a processor (e.g., 222) in a thermal imaging camera. In some such examples, one or both of the VL and IR images may be captured by the same camera or a different camera. In some embodiments, IR and VL images captured by the same or different cameras may be transferred to an external processing device, such as a computer, tablet, smartphone, or the like, which may perform any number of processing steps (e.g., registration, generating modified VL images, blending, etc.). In some examples, corresponding IR and VL images may be captured and processed to generate a blended image as described herein by a single device. In some embodiments, such image capturing and processing may be performed in substantially real time, for instance, using a live stream of images to generate a video signal comprising a series of blended images. In general, as used herein, unless specifically stated otherwise, the term "image" may refer to a single image frame, such as an image store in and recalled from memory, a still frame from a video feed, a live or prerecorded video feed comprising a series of captured still images, a live video feed in which some portions of the display are dynamically updated at different time than others, or other known image data presentation schemes.

In some embodiments, one or both of IR and VL image data comprises a stream of data received by the processor. In some such embodiments, the processor can receive a stream of image data and generate a video file therefrom. For example, in some embodiments, the processor can receive a stream of IR image data and VL image data, and generate therefrom a video file. In various embodiments, the generated video file can comprise IR image data, VL image data, or a combination of blended IR and VL image data. In some embodiments, processing techniques described herein may be performed to the image data stream as it is received by the processor.

As used herein, "IR" may refer to wavelengths in any portion of the infrared spectrum, such as LWIR (between approximately 8 microns and 14 microns), MWIR (between approximately 3 microns and 5 microns), SWIR (between approximately 1 micron and approximately 2 microns), or any combination of these ranges or wavelengths therebetween. "VL" images typically refer to wavelengths in the visible spectrum (e.g., between approximately 400 nanometers and approximately 700 nanometers). However, the processes as described herein for use with VL images may be performed using alternative wavelengths, such as NIR (e.g., between approximately 700 nm and 1000 nm) or UV (e.g., between approximately 200 nm and 400 nm). In general, processes for combining IR and VL images described herein may be performed on any set of two or more images.

Various aspects of methods described herein may be adjusted by a user. For example, a thermal imaging camera capable of executing such methods may include a user interface (e.g., 108, 112, 114, 116) for receiving one or more inputs from a user. In some examples, a user may adjust at least one of, for example, the IR palettization scheme, an edge gain used for determining edge factor values, the edge midscale value, a type of image blending (e.g., constant across image, EFV-dependent, a combination thereof, and the like), the amount of image blending (e.g., blending ratios). In other embodiments, one or more of such parameters may be fixed.

In some embodiments, various edge detection techniques may be included in the VL image processing, such as described in U.S. patent application Ser. No. 14/222,153, filed Mar. 21, 2014 and entitled "VISIBLE LIGHT IMAGE WITH EDGE MARKING FOR ENHANCING IR IMAGERY," which is assigned to the assignee of the instant application and is hereby incorporated by reference in its entirety. In some such embodiments, pixels determined to correspond to edges in the VL image may be used in a variety of ways. For instance, in some examples, blending ratios used for each pixel in creating the blended image may be dependent on whether or not the corresponding VL pixel is determined to be an edge pixel. Additionally or alternatively, edge factor values may be determined for one or more VL pixels based on whether or not the pixel is determined to be an edge pixel.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

For example, an external computer comprising such computer readable medium can receive corresponding visible light and infrared images from a thermal imaging camera or from memory and perform edge detection and/or process the VL and IR images to generate display images as described herein. In some embodiments, various portions of the techniques can be embodied in multiple components. For example, a thermal imaging camera can detect edges in a visible light image and pass detected edge information to an external computing device for generating the display image incorporating the detected edges. Additionally or alternatively, the external computing device may assist in or otherwise perform edge detection and/or enhancement techniques.

In further examples, embodiments of the invention can be embodied in a display system. The display system can be configured to receive VL and IR image data and carry out processes such as those herein described. Exemplary display systems can include one or more processors, a display and a user interface for carrying out such processes. A display system can be incorporated into any appropriate device or system capable of receiving and processing image data. In some embodiments, the display system can include a portable, hand-held thermal imaging camera such as those described elsewhere herein in order to capture corresponding VL and IR images and provide VL and IR image data to other components of the imaging system. In further embodiments, the imaging system is fully incorporated into such a camera, or can consist essentially of a camera capable of carrying out any of the various processes described.

Various embodiments have been described. Such examples are non-limiting, and do not define or limit the scope of the invention in any way. Rather, these and other examples are within the scope of the following claims.

The invention claimed is:

1. A thermal imaging system configured to generate images having infrared image data and enhanced edges comprising:
an infrared camera module for receiving infrared radiation from a target scene and generating infrared image data representative of the target scene;
a visible light camera module for receiving visible light radiation from the target scene and generating visible light image data representative of the target scene, the visible light image data having a plurality of regions corresponding to regions of the target scene;
a processor in communication with the infrared camera module and the visible light camera modules, the processor configured to:
receive visible light image data from the visible light camera module;
receive infrared image data corresponding to the received visible light image data from the infrared camera module;
determine, for each of the plurality of regions in the received visible light image data, a corresponding edge factor value associated with edges in the visible light image data;
generate modified visible light image data having a plurality of regions corresponding to the plurality of regions in the visible light image data by combining, for each of the plurality of regions of the modified visible light image data, an edge midscale value and the corresponding edge factor value, the edge midscale value corresponding to a specific color, and the combining the edge midscale value and the corresponding edge factor value comprising, for each of the plurality of regions, adjusting a luminance of the edge midscale value using the corresponding edge factor value; and
combine the modified visible light image data with the corresponding received infrared image data to create combined image data.

2. The system of claim 1, further comprising a user interface in communication with the processor, and wherein the processor is configured to receive a selection of the edge midscale value from the user interface.

3. The system of claim 2, wherein:
the user interface comprises a display;
the processor is configured to present a predetermined list of possible edge midscale values via the display; and wherein
receiving a selection of the edge midscale value from the user interface comprises receiving a selection of the edge midscale value from the predetermined list of possible edge midscale values.

4. The system of claim 1, further comprising a user interface, and wherein the processor is configured to receive an edge gain input via the user interface; and
determining the edge factor value for each of the plurality of regions of the received visible light image data comprises:
performing an embossing process on the visible light image data in order to determine an emboss value for each of the plurality of regions within the visible light image data; and
scaling the determined emboss value by the edge gain input.

5. The system of claim 1, further comprising a display in communication with the processor, and wherein the processor is configured to present the combined image data as a display image on the display.

6. The system of claim 1, wherein combining the modified visible light image data with the corresponding received infrared image data comprises, for each of the plurality of regions of the modified visible light image data, blending the modified visible light image data with the corresponding infrared image data, the blending being performed based on a blending ratio α associated with each of the plurality of regions, and wherein, for each of the plurality of regions, the blending ratio α for the region is based on the edge factor value associated with the corresponding region in the visible light image data.

7. The system of claim 6, wherein, for each of the plurality of regions of the modified visible light image data, if the edge factor value associated with the corresponding region in visible light image data is below a threshold value, the blending ratio is set so that the combined image data includes a minimum amount of modified visible light image data.

8. The system of claim 7, wherein the minimum amount of modified visible light image data comprises zero percent modified visible light image data, such that if the edge factor value associated with the corresponding region in visible light image data is below a threshold value, a corresponding region in the combined image data includes no modified visible light image data.

9. The system of claim 1, wherein combining the modified visible light image data with the corresponding received infrared image data comprises, for each of the plurality of regions of the modified visible light image data, blending the modified visible light image data with the corresponding infrared image data, the blending being performed based on a blending ratio α associated with each of the plurality of regions, and wherein, for each of the plurality of regions, the blending ratio α for the region is inversely related to a magnitude of the infrared image data for the corresponding region.

10. The system of claim 1, wherein the combining, for each of the plurality of regions of the modified visible light image data, an edge midscale value and the corresponding edge factor value does not change the chrominance of the edge midscale value, such that each of the plurality of regions in the modified visible light image includes the chrominance of the edge midscale value and a luminance that is based on the luminance of the edge midscale value and the corresponding edge factor value.

11. The system of claim 1, wherein each of the plurality of regions in the visible light image data, the infrared image data, and the combined image data correspond to single pixels.

12. A non-transitory computer readable medium comprising instructions executable by a programmable processor that, when executed, cause the programmable processor to:
receive visible light image data comprising a plurality of regions;
receive infrared image data comprising a plurality of regions, each of the plurality of regions of the received infrared image data corresponding to one of the plurality of regions of the received visible light image data;
determine, for each of the plurality of regions in the received visible light image data, a corresponding edge factor value associated with edges in the visible light image data;
generate modified visible light image data having a plurality of regions corresponding to the plurality of regions in the visible light image data by combining, for each of the plurality of regions of the modified visible light image data, an edge midscale value and the corresponding edge factor value, the edge midscale value corresponding to a specific color; and
blend the generated modified visible light image data and the received infrared image data to create a blended image, the blended image having plurality of regions corresponding to the plurality of regions in the visible light image data and the infrared image data; wherein
for each of the plurality of regions in the blended image, an amount of contribution from each of the modified visible light image data and the infrared image data in the blended image is based on the edge factor value associated with the corresponding region in the visible light image data.

13. The non-transitory computer readable medium of claim 12, wherein, for each of the plurality of regions, the contribution of the infrared image data in the blended image varies inversely with the edge factor value associated with the corresponding region in the visible light image data.

14. The non-transitory computer readable medium of claim 12, wherein, if the edge factor value associated with a given region in the visible light image data is below a predetermined threshold, the corresponding region in the blended image includes a minimum contribution of the modified visible light image data.

15. The non-transitory computer readable medium of claim 14, wherein the minimum contribution of the modified visible light image data in the blended image is zero percent, such that if the edge factor value associated with a given region in the visible light image data is below a predetermined threshold, the corresponding region in the blended image includes no modified visible light image data.

16. The non-transitory computer readable medium of claim 12, wherein, for each of the plurality of regions in the blended image, the amount of contribution from each of the modified visible light image data and the infrared image data in the blended image is further based on a magnitude of the infrared image data in the corresponding region.

17. The non-transitory computer readable medium of claim 16, wherein the method further comprises the step of receiving a selected edge midscale value.

18. The non-transitory computer readable medium of claim 12, wherein, for each of the plurality of regions in the blended image, the contribution from the infrared image data relative to the contribution of the modified visible light image data varies inversely with the edge factor value.

19. The non-transitory computer readable medium of claim 12, wherein each of the plurality of regions in the visible light image data, the infrared image data, and the modified visible light image data correspond to single pixels.

20. The non-transitory computer readable medium of claim 12, wherein the combining, for each of the plurality of regions of the modified visible light image data, an edge midscale value and the corresponding edge factor value does not change the chrominance of the edge midscale value, such that each of the plurality of regions in the modified visible light image includes the chrominance of the edge midscale value and a luminance that is based on the luminance of the edge midscale value and the corresponding edge factor value.

* * * * *